US012745207B2

(12) United States Patent
Shrivastava

(10) Patent No.: US 12,745,207 B2
(45) Date of Patent: Sep. 22, 2026

(54) NON-TERRESTRIAL NETWORK CAPABILITIES FOR POSITIONING

(71) Applicant: QUALCOMM Incorporated, San Diego, CA (US)

(72) Inventor: Avinash Shrivastava, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 18/602,932

(22) Filed: Mar. 12, 2024

(65) Prior Publication Data

US 2025/0294497 A1 Sep. 18, 2025

(51) Int. Cl.

| | |
|---|---|
| ***H04W 64/00*** | (2009.01) |
| ***H04W 4/14*** | (2009.01) |
| ***H04W 8/22*** | (2009.01) |
| ***H04W 76/20*** | (2018.01) |
| ***H04W 84/06*** | (2009.01) |

(52) U.S. Cl.
CPC ............ *H04W 64/00* (2013.01); *H04W 4/14* (2013.01); *H04W 8/22* (2013.01); *H04W 76/20* (2018.02); *H04W 84/06* (2013.01)

(58) Field of Classification Search
None
See application file for complete search history.

(56) References Cited

U.S. PATENT DOCUMENTS

| | | | | |
|---|---|---|---|---|
| 2021/0360371 | A1* | 11/2021 | Qiao | H04W 4/029 |
| 2024/0098679 | A1* | 3/2024 | Ghimire | H04W 24/10 |
| 2025/0016841 | A1* | 1/2025 | Huang | H04W 64/00 |
| 2025/0267448 | A1* | 8/2025 | Zhang | H04W 76/16 |

FOREIGN PATENT DOCUMENTS

WO 2022238080 A1 11/2022

OTHER PUBLICATIONS

International Search Report and Written Opinion—PCT/US2025/015860—ISA/EPO—May 16, 2025.

* cited by examiner

*Primary Examiner* — Diane L Lo
(74) *Attorney, Agent, or Firm* — Thien T. Nguyen

(57) ABSTRACT

Aspects presented herein may enable a location server to obtain/know the non-terrestrial network (NTN) capabilities of a user equipment (UE) to improve the overall performance and efficiency of UE positioning. In one aspect, a location server receives a set of NTN capabilities associated with a UE. The location server receives an indication of the UE being camped on an NTN cell based on at least one of: (1) when a radio resource connection (RRC) reconnection is established for the UE between a terrestrial network (TN) and an NTN during a positioning session, (2) when the UE has both TN connectivity and NTN connectivity during the positioning session, or (3) when the UE has at least one high priority task. The location server transmits, for the UE in response to the indication, updated assistance data (AD) based on the set of NTN capabilities associated with the UE.

18 Claims, 15 Drawing Sheets

1202
Receive a set of non-terrestrial network (NTN) capabilities associated with a user equipment (UE)

1204
Receive an indication of the UE being camped on an NTN cell based on at least one of: (1) when a radio resource connection (RRC) reconnection is established for the UE between a terrestrial network (TN) and an NTN during a positioning session, (2) when the UE has both TN connectivity and NTN connectivity during the positioning session, or (3) when the UE has at least one high priority task 1206
Transmit, for the UE in response to the indication, updated assistance data (AD) based on the set of NTN capabilities associated with the UE 200
One Frame (TDD)
10 ms
subframe
RB
slot
D D D D D D D D D D D D F U
OFDM symbol
slot
subcarrier
DMRS R
CSI-RS 230
PDCCH CORESET
SSS
PSS
PDSCH
PBCH
REG 12 REs
1 CCE = 6 REGs
SS/PBCH Block
BWP
BWP
20 RBs
channel bandwidth RBs 250
One Frame (TDD)
10 ms
subframe
RB
slot
U U U U U U U U U U U U U U
OFDM symbol
slot
SRS
subcarrier
SRS Comb 0
SRS Comb 1
DMRS R

280
PUCCH
PUSCH 800A
804
Serving BS
806
802
806
804
804
1. UE is connected to serving base station on terrestrial network.
2. AD is mixed of TN and NTN base stations.

NON-TERRESTRIAL NETWORK CAPABILITIES FOR POSITIONING

TECHNICAL FIELD

The present disclosure relates generally to communication systems, and more particularly, to wireless communication involving non-terrestrial network (NTN).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some telecommunication standards also provide positioning protocols and techniques that enable mobile network operators to provide high-accuracy location services to their subscribers. For example, 5G NR include various standards for network-based positioning that use signals and features of the 5G network to perform or improve the positioning of a device. There also exists a need for further improvements in these positioning protocols and techniques.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives a set of non-terrestrial network (NTN) capabilities associated with a user equipment (UE). The apparatus receives an indication of the UE being camped on an NTN cell based on at least one of: (1) when a radio resource connection (RRC) reconnection is established for the UE between a terrestrial network (TN) and an NTN during a positioning session, (2) when the UE has both TN connectivity and NTN connectivity during the positioning session, or (3) when the UE has at least one high priority task. The apparatus transmits, for the UE in response to the indication, updated assistance data (AD) based on the set of NTN capabilities associated with the UE.

In an aspect of the disclosure, a method, a computer-readable medium, and an apparatus are provided. The apparatus transmits a set of NTN capabilities associated with the UE. The apparatus camps on an NTN cell based on at least one of: (1) when an RRC reconnection is established for the UE between a TN and an NTN during a positioning session, (2) when the UE has both TN connectivity and NTN connectivity during the positioning session, or (3) when the UE has at least one high priority task. The apparatus receives, from a location server based on the UE being camped on the NTN cell, updated AD configured based on the set of NTN capabilities associated with the UE.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
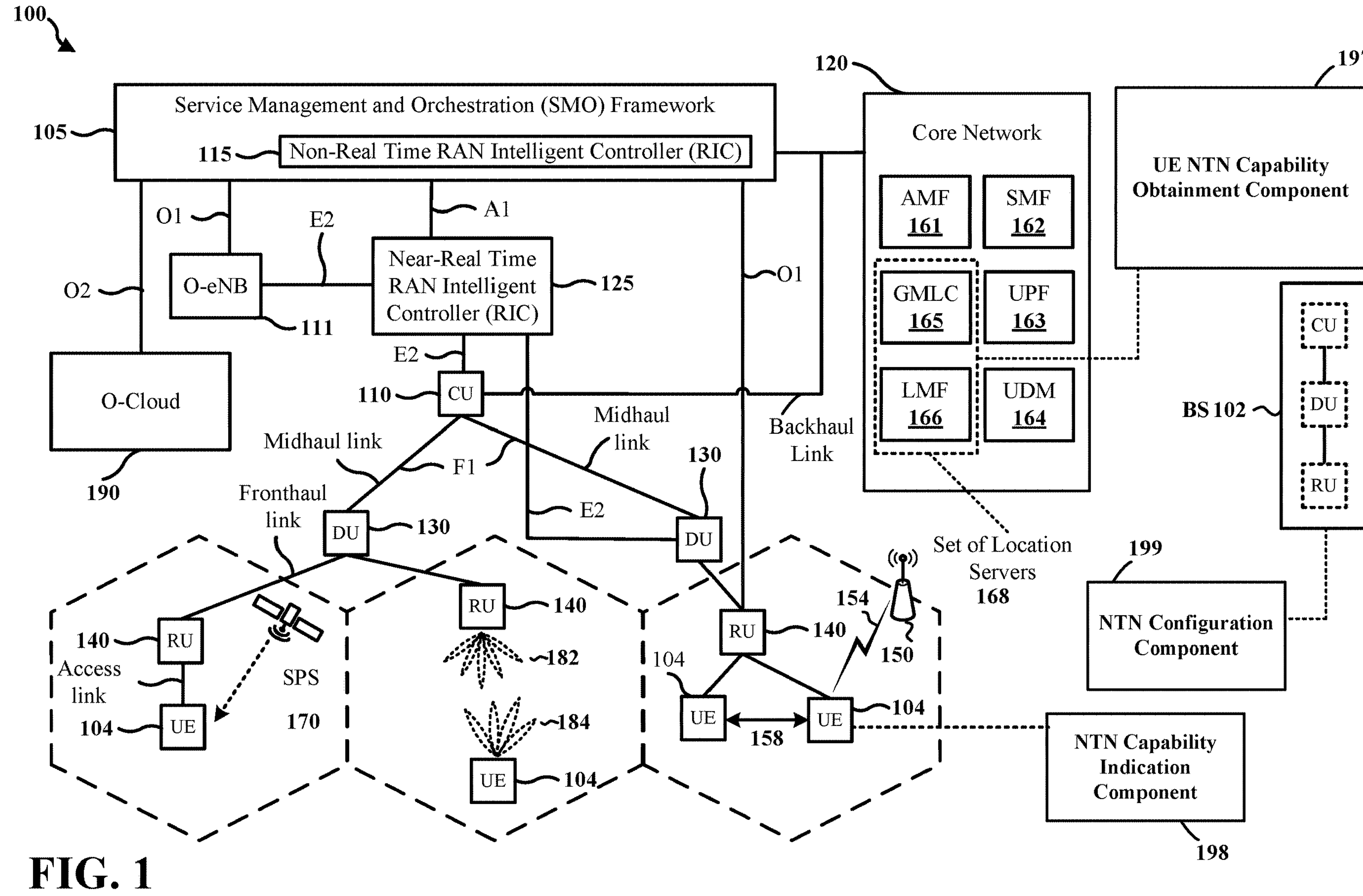
FIG. 1 is a diagram illustrating an example of a wireless communications system and an access network.

Aspects presented herein may improve the overall performance and efficiency for positioning when a user equipment (UE) has both terrestrial network (TN) and non-terrestrial network (NTN) capabilities. Aspects presented herein may enable a location server to obtain/know the NTN capabilities of a UE, which may be helpful when the UE camps on (e.g., connects with) an NTN cell when there is no TN cell available. For example, with the help/knowledge of the NTN capabilities of the UE, the location server may send updated assistance data (AD) to the UE for the UE to calculate its location, which may be achieved with LTE Positioning Protocol (LPP) and/or standalone sessions with a private or a third-party location server. In another example, when there is a sudden TN coverage loss happens at a UE or the UE is alone in emergency cases, the NTN capabilities of the UE may help the UE to determine its location standalone even if the NTN has spotty/weak coverage. In another example, intersatellite link (ISL) activation in high priority use cases may also be possible if the location server has the capability to know the NTN capabilities of a UE, as the location server may be able to determine the location of the UE and instruct a network (e.g., a 4G/5G core network) to activate nearby ISL satellite for immediate support. Knowing the NTN capabilities of a UE may be useful as a location server may be configured to be (always) in synchronization with the network (e.g., the 5G RAN and core network) so they may be aware of the NTN satellite position and when the next satellite comes into visibility. In another example, after exchanging NTN (real-time) information with a location server, a UE may be able to adjust its positioning capabilities (e.g., it may trim down or can expand). Then, based on the location server bandwidth and/or current NTN/TN scenario and capability, positioning session(s) may be leveraged as well (similar things which the UE may adopt). Aspects presented herein may also be helpful for an over-the-top (OTT) server as well as a network entity/node that works with NTN.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHz), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the one or more location servers 168 may have a UE NTN capability obtainment component 197 that may be configured to receive a set of NTN capabilities associated with a UE; receive an indication of the UE being camped on an NTN cell based on at least one of: (1) when an RRC reconnection is established for the UE between a TN and an NTN during a positioning session, (2) when the UE has both TN connectivity and NTN connectivity during the positioning session, or (3) when the UE has at least one high priority task; and transmit, for the UE in response to the indication, updated AD based on the set of NTN capabilities associated with the UE. In certain aspects, the UE 104 may have an NTN capability indication component 198 that may be configured to transmit a set of NTN capabilities associated with the UE; camp on an NTN cell based on at least one of: (1) when an RRC reconnection is established for the UE between a TN and an NTN during a positioning session, (2) when the UE has both TN connectivity and NTN connectivity during the positioning session, or (3) when the UE has at least one high priority task; and receive, from a location server based on the UE being camped on the NTN cell, updated AD configured based on the set of NTN capabilities associated with the UE. In certain aspects, the base station 102 may have an NTN configuration component 199 that may be configured to provide configurations and/or parameters related to NTN for the UE 104.

Figures 2A, 2B, 2C, 2D:
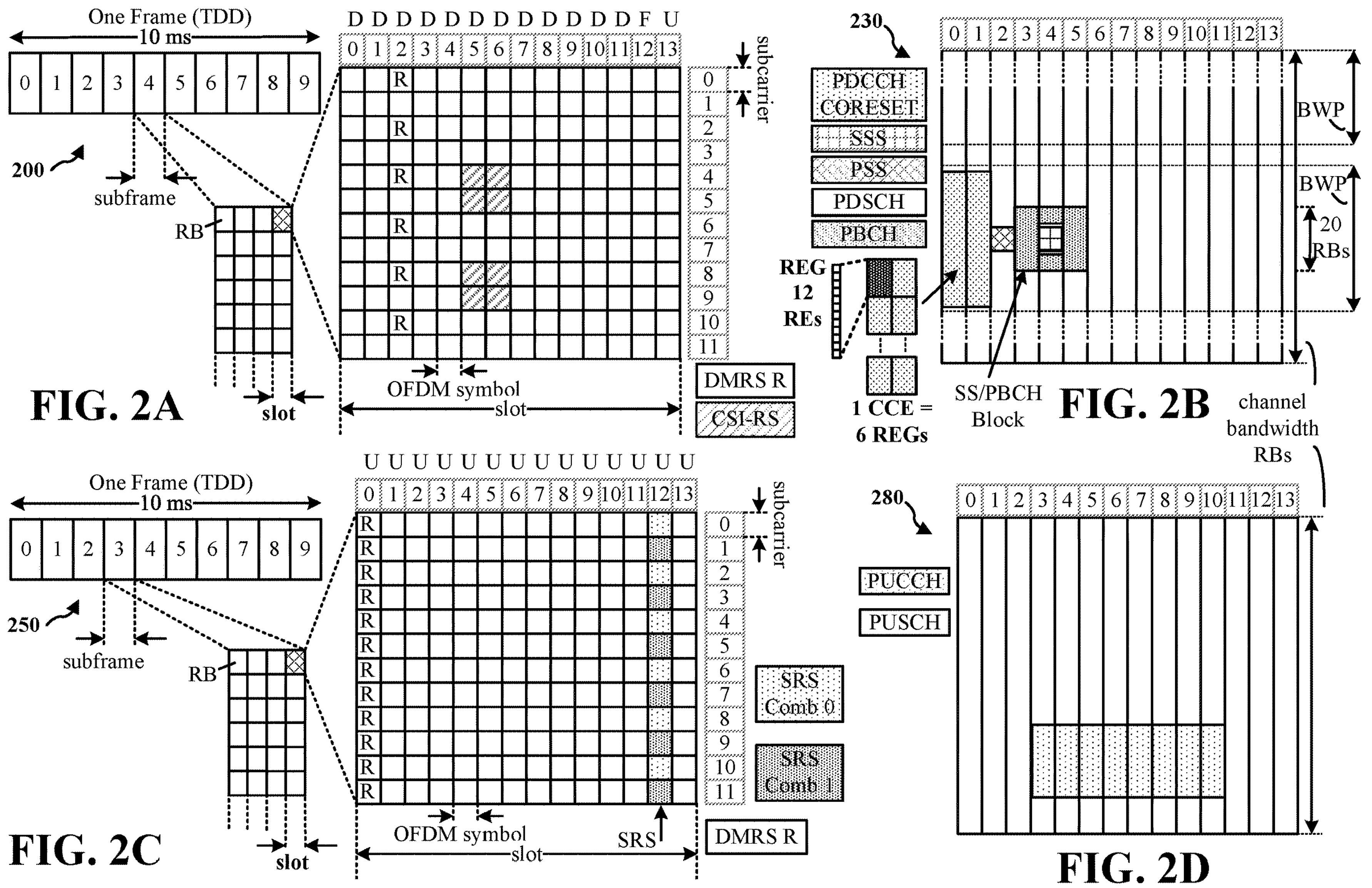
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
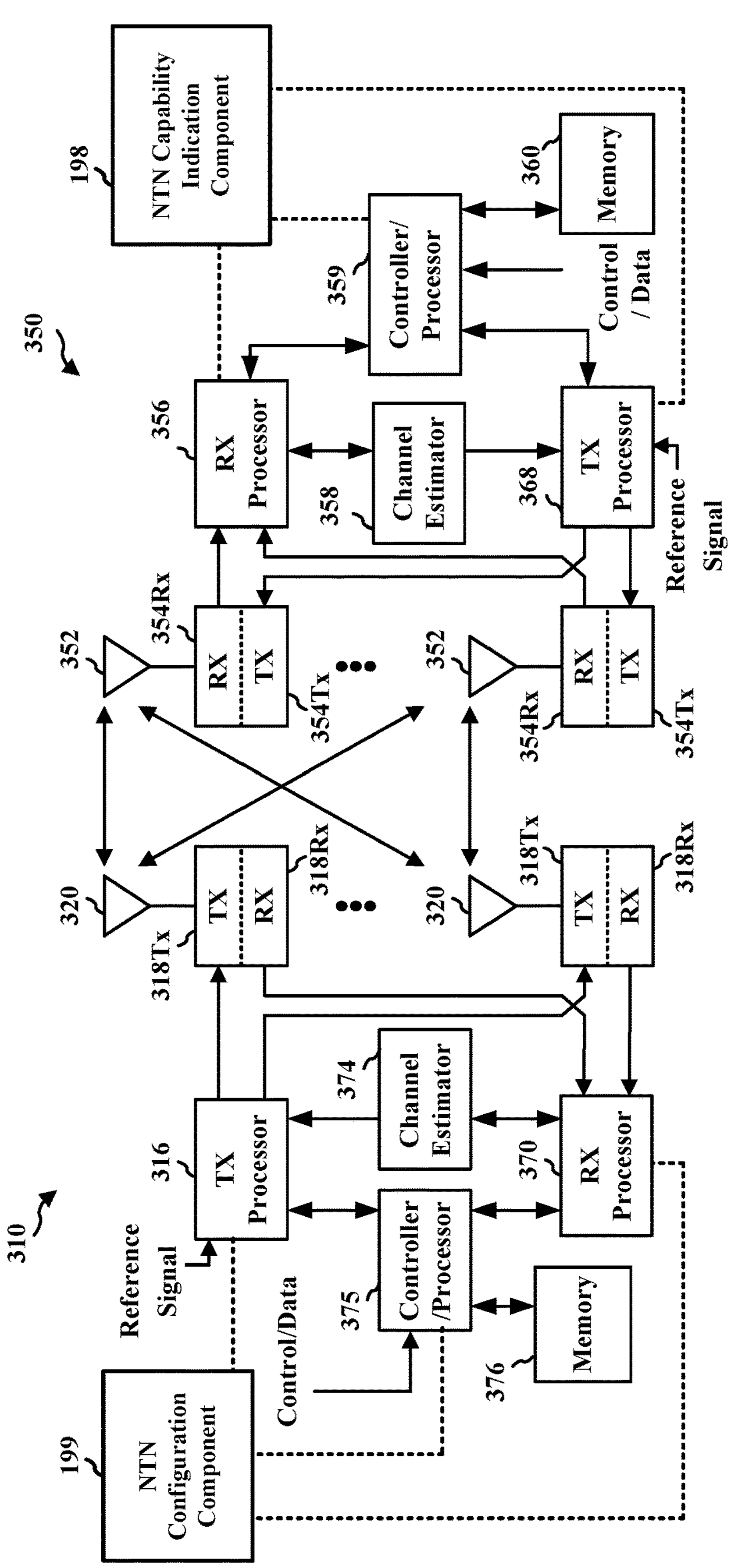
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the NTN capability indication component 198 of FIG. 1.

At least one of the TX processor 316, the RX processor 370, and the controller/processor 375 may be configured to perform aspects in connection with the UE NTN capability obtainment component 199 of FIG. 1.

Figure 4:
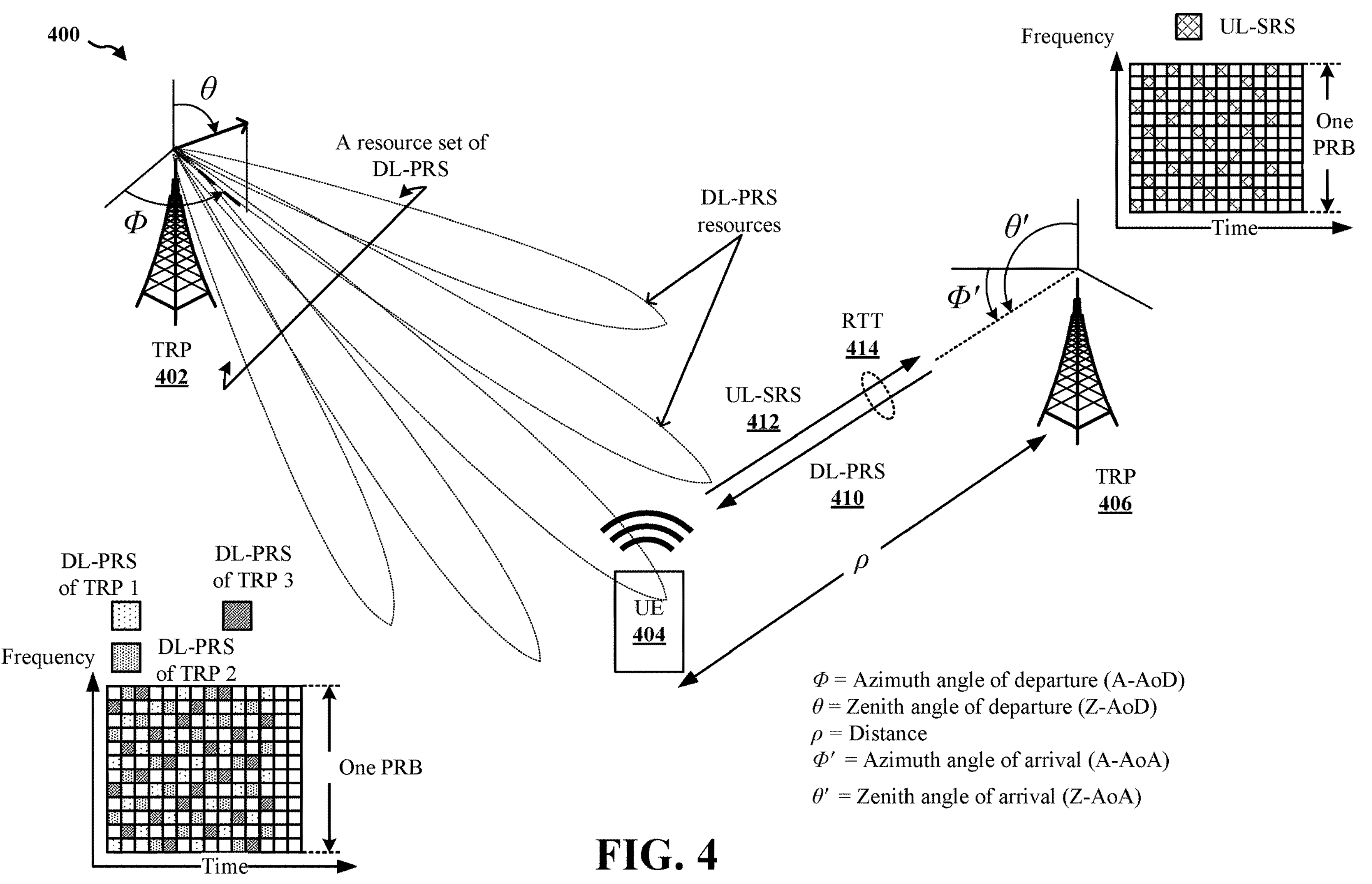
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

A device (e.g., a UE) equipped with a global navigation satellite system (GNSS) receiver may determine its location based on reception of signals from multiple satellites, which may be referred to as "GNSS-based positioning" or "satellite-based positioning." GNSS is a network of satellites broadcasting timing and orbital information used for navigation and positioning measurements. In addition, GNSS may refer to the International Multi-Constellation Satellite System, which may include global positioning system (GPS), global navigation satellite system (GLONASS), Beidou, Galileo, and any other constellation system. GNSS may include multiple groups of satellites (which may be referred to as GNSS satellites), known as constellations, that broadcast signals (which may be referred to as GNSS signals) to control stations and users of the GNSS. Based on the broadcast signals, the users may be able to determine their locations (e.g., via a trilateration process). For purposes of the present disclosure, a device (e.g., a UE) that is equipped with a GNSS receiver or is capable of receiving GNSS signals may be referred to as a GNSS device, and a device that is capable of transmitting GNSS signals, such as a satellite, may be referred to as a space vehicle (SV).

Figure 5:
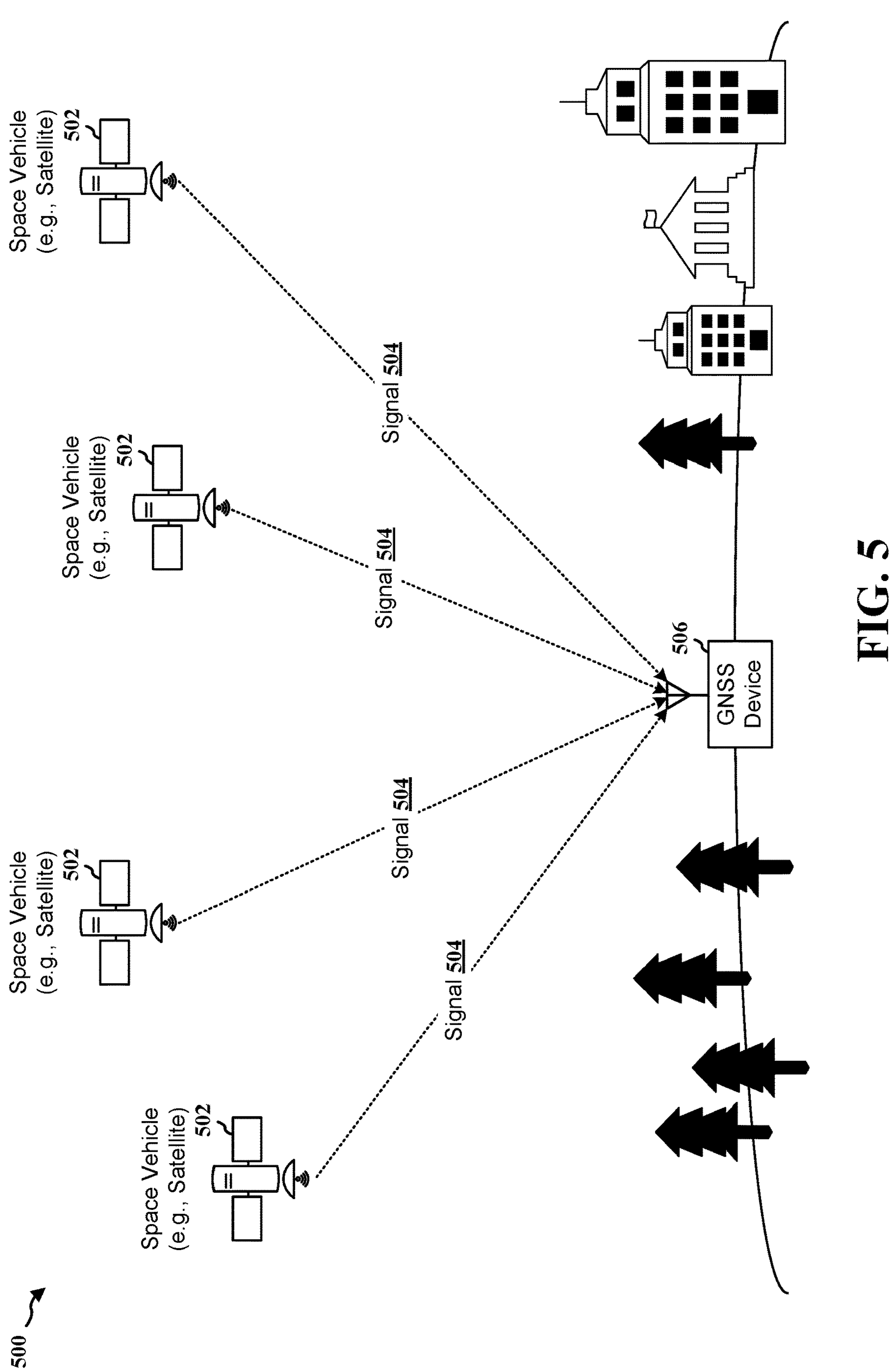
FIG. 5 is a diagram illustrating an example of global navigation satellite system (GNSS) positioning in accordance with various aspects of the present disclosure.

FIG. 5 is a diagram 500 illustrating an example of GNSS positioning in accordance with various aspects of the present disclosure. A GNSS device 506 may calculate its position and time based at least in part on data (e.g., GNSS signals 504) received from multiple space vehicles (SVs) 502, where each SV 502 may carry a record of its position and time and may transmit that data (e.g., the record) to the GNSS device 506. Each SV 502 may further include a clock that is synchronized with other clocks of SVs and with ground clock(s). If an SV 502 detects that there is a drift from the time maintained on the ground, the SV 502 may correct it. The GNSS device 506 may also include a clock, but the clock for the GNSS device 506 may be less stable and precise compared to the clocks for each SV 502.

As the speed of radio waves may be constant and independent of the satellite speed, a time delay between a time the SV 502 transmits a GNSS signal 504 and a time the GNSS device 506 receives the GNSS signal 504 may be proportional to the distance from the SV 502 to the GNSS device 506. In some examples, a minimum of four SVs may be used by the GNSS device 506 to compute/calculate one or more unknown quantities associated with positioning (e.g., three position coordinates and clock deviation from satellite time, etc.).

Each SV 502 may broadcast the GNSS signal 504 (e.g., a carrier wave with modulation) continuously that may include a pseudorandom code (e.g., a sequence of ones and zeros) which may be known to the GNSS device 506, and may also include a message that includes a time of transmission and the SV position at that time. In other words, each GNSS signal 504 may carry two types of information: time and carrier wave (e.g., a modulated waveform with an input signal to be electromagnetically transmitted). Based on the GNSS signals 504 received from each SV 502, the GNSS device 506 may measure the time of arrivals (TOAs) of the GNSS signals 504 and calculate the time of flights (TOFs) for the GNSS signals 504. Then, based on the TOFs, the GNSS device 506 may compute its three-dimensional position and clock deviation, and the GNSS device 506 may determine its position on the Earth. For example, the GNSS device 506's location may be converted to a latitude, a longitude, and a height relative to an ellipsoidal Earth model. These coordinates may be displayed, such as on a moving map display, or recorded or used by some other system, such as a vehicle guidance system.

While the distance between a GNSS device and an SV may be calculated based on the time it takes for a GNSS signal to reach the GNSS device, the SV's signal sequence may be delayed in relation to the GNSS device's sequence. Thus, in some examples, a delay may be applied to the GNSS device's sequence, such that the two sequences are aligned. For example, to calculate the delay, a GNSS device may align a pseudorandom binary sequence contained in the SV's signal to an internally generated pseudorandom binary sequence. As the SV's GNSS signal takes time to reach the GNSS device, the SV's sequence may be delayed in relation to the GNSS device's sequence. By increasingly delaying the GNSS device's sequence, the two sequences may eventually be aligned.

The accuracy of GNSS-based positioning may depend on various factors, such as satellite geometry, signal blockage, atmospheric conditions, and/or receiver design features/quality, etc. For example, GNSS receivers used by smartphones or smart watches may have lower accuracy compared to GNSS receivers used by vehicles and surveying equipments. To improve the accuracy of GNSS positioning (e.g., from meters to centimeters), a real time kinematics (RTK) technique or mechanism (which may collectively be referred to as an "RTK engine" hereafter) may be used for a positioning device (e.g., a UE, a surveying equipment, an automobile GNSS system, etc.). For example, an RTK engine may enable a positioning device to use correction information from a base station to mitigate one or more error sources in GNSS receiver pseudo-range (PR) and carrier-phase (CP) measurements, which may include satellite orbit error, satellite clock error, and/or atmospheric error, etc. Thus, better accuracy may be achieved by the positioning device.

A UE may have the capability to communicate with a network entity that is non-terrestrial, which may be referred to as a non-terrestrial network (NTN). An NTN may refer to a network, or segments of a network, using at least one airborne device (e.g., an aircraft) or satellite (e.g., a low earth orbit (LEO) satellite, a medium earth orbit (MEO) satellite, a geostationary earth orbit (GEO) satellite, a high elliptical orbit (HEO) satellite, and/or a high-altitude pseudo satellite (HAPS), etc.) for communication (e.g., for transmitting data or receiving data). For example, an NTN may support a direct communication between a UE (e.g., a handset, a mobile phone, etc.) and a satellite (e.g., a LEO satellite, a GEO satellite, etc.), where the UE may transmit data (e.g., text messages and/or voice services, etc.) to another UE via the satellite. For purposes of the present disclosure, an NTN may include just NTN cell(s), or a mix of NTN cell(s) and ground cell(s). As such, for a positioning operation associated with an NTN, the positioning operation may involve NTN cell(s) without ground cell(s), a mix of NTN and ground cells, and/or hybrid solutions involving NTN cells, ground cells, GNSS satellites, and/or other ground-based positioning reference points such as WiFi, Bluetooth, etc.

Figure 6:
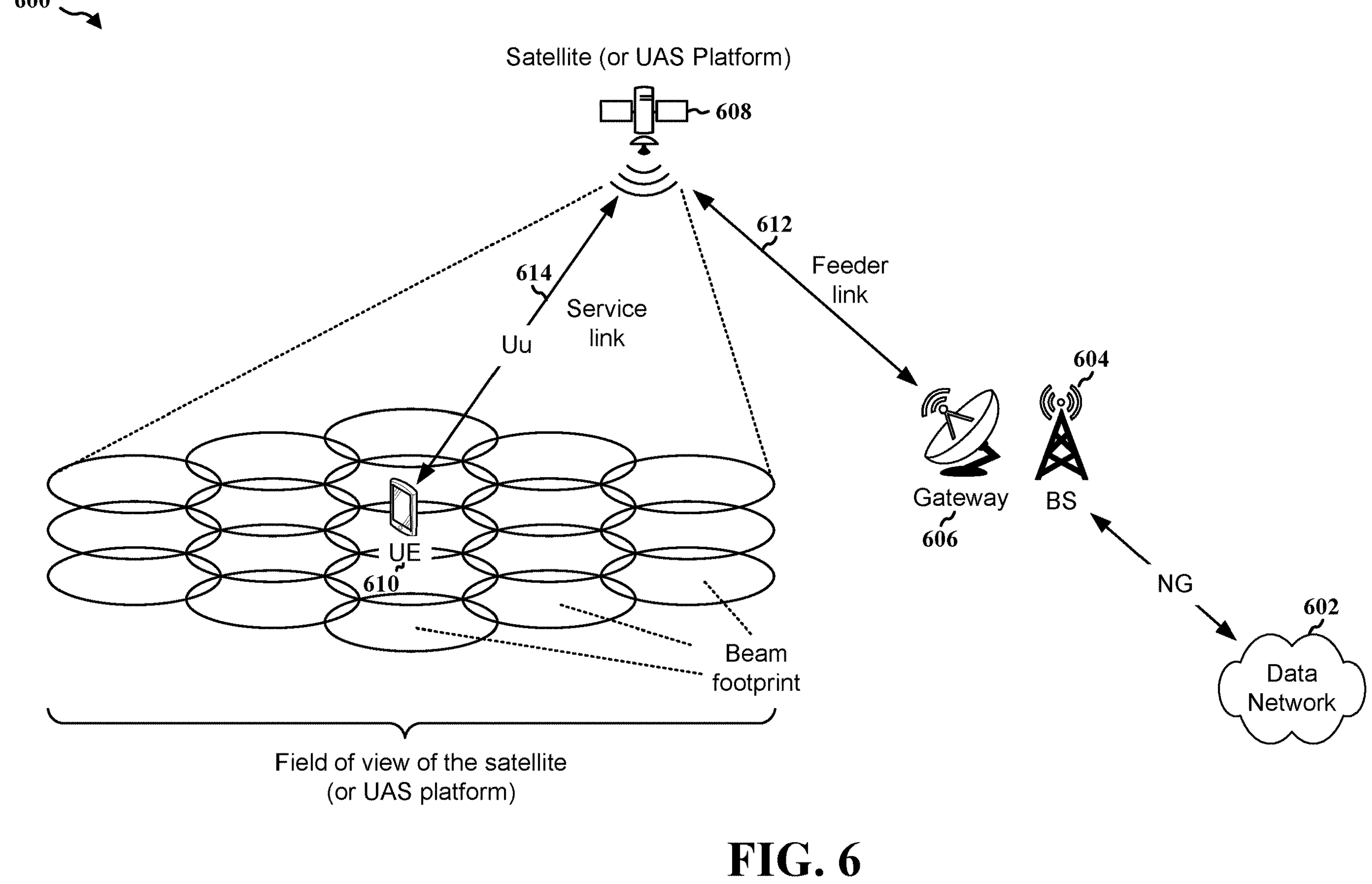
FIG. 6 is a diagram illustrating an example of a non-terrestrial network (NTN) architecture based on a transparent payload in accordance with various aspects of the present disclosure.

FIG. 6 is a diagram 600 illustrating an example of an NTN architecture based on a transparent payload in accordance with various aspects of the present disclosure. A data network 602 (e.g., a 5G core (5GC) network) may connect to a base station 604 (e.g., a network entity, an gNB, etc.) via a communication interface (e.g., a next generation (NG) interface). The base station 604 may be located on the ground and connected to an NTN gateway 606, where the NTN gateway 606 may be connected to an NTN payload 608 (e.g., a network node embarked onboard a satellite, an unmanned aircraft systems (UAS), or HAPS, etc.) via a feeder link 612. The NTN payload 608 may connect to a UE 610 via a service link 614 (e.g., using the UE-UTRAN (Uu) interface). Under the transparent payload NTN architecture, the base station 604 may be a ground station and the NTN payload 608 (e.g., the satellite) may function like a relay, where the NTN payload 608 may provide radio frequency filtering, frequency conversion, and/or amplification for data/payload received from the base station 604 via the NTN gateway 606 and relay/transmit the data/payload to the UE 610. As such, the waveform or signal relayed/repeated by the NTN payload 608 may be un-changed. In some examples, the ground area(s) covered by the NTN payload 608 may be referred to as "footprint(s)" and/or "beam footprint(s)." The footprint of a satellite may be a ground area in which its transponders offer coverage, and the footprint may also determine the satellite dish diameter for receiving each transponder's signal. In some examples, there may be a different coverage map for each transponder (or group of transponders), as each transponder may be configured to cover different areas. Table 2 below shows examples of altitudes and footprint sizes for different types of satellite platforms, where different satellite platforms may have different distance, delay, and/or coverage on the earth.

TABLE 2 example altitudes and footprint sizes for different types of satellite platforms

| Platforms | Altitude Range | Orbit | Typical Beam Footprint Size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (LEO) satellite | 35786 km | Notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

Figure 7:
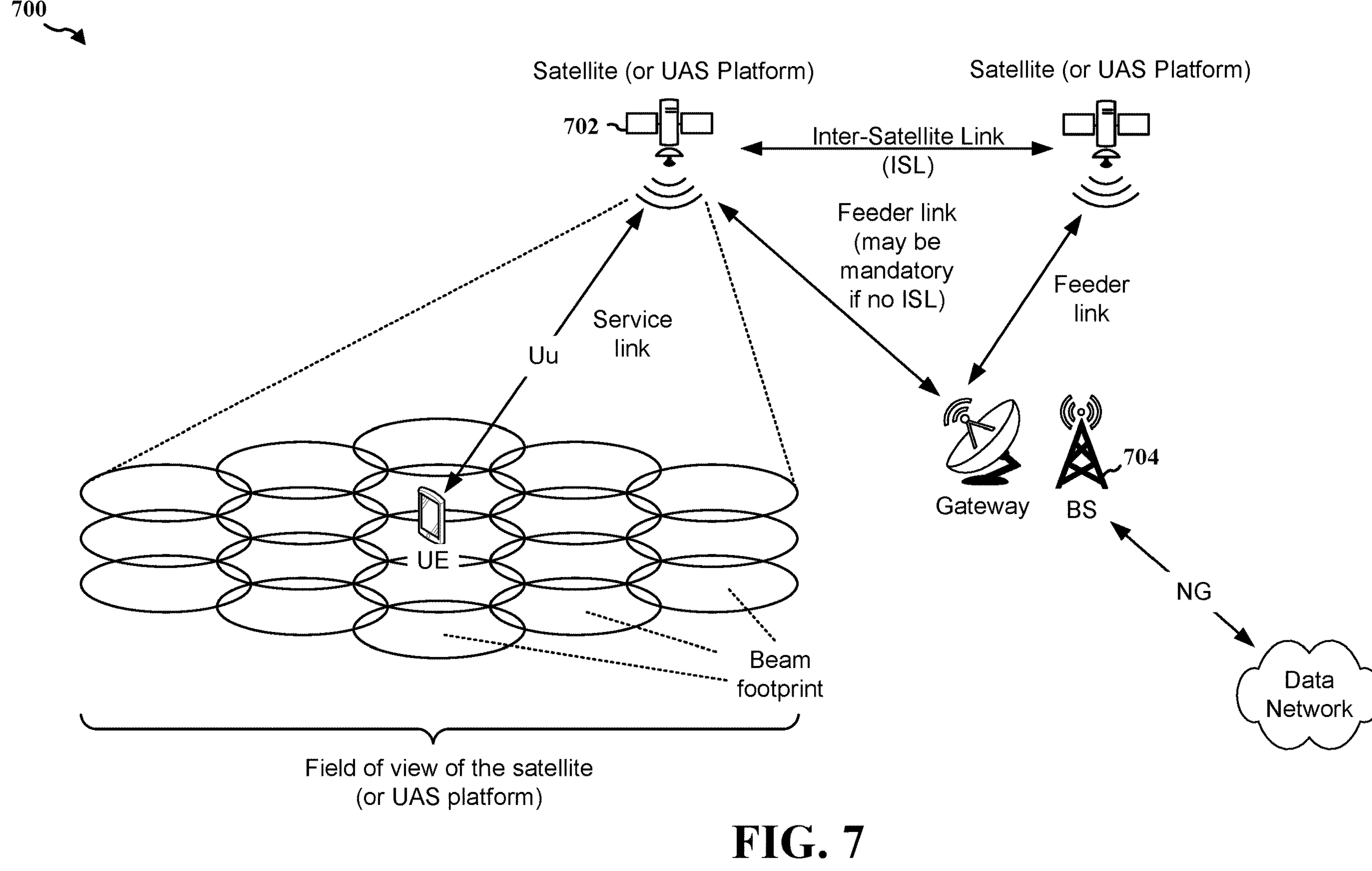
FIG. 7 is a diagram illustrating an example of an NTN architecture based on a regenerative payload in accordance with various aspects of the present disclosure.

FIG. 7 is a diagram 700 illustrating an example of an NTN architecture based on a regenerative payload in accordance with various aspects of the present disclosure. In some examples, an NTN network may include at least one satellite 702 with a regenerative payload, enabling the satellite to be a distributed unit (DU), or a full base station 704 supporting a satellite-enabled new radio, radio access network (NR-RAN). For example, for a satellite with regenerative payload, the satellite may regenerate incoming signals with signal-processing techniques such as demodulation, decoding, switching, encoding, and modulation before transmission, which may improve division of spectrum. In addition, a satellite with a regenerative payload may include on-board processing (e.g., a digital transparent processor (DTP) or a fully regenerative (FR) transponder). In some examples, inter-satellite links (ISLs) may be established between satellites with regenerative payloads for communications, which may increase the geographical coverage of the receiving ground station/user terminal.

Figures 8A, 8B:
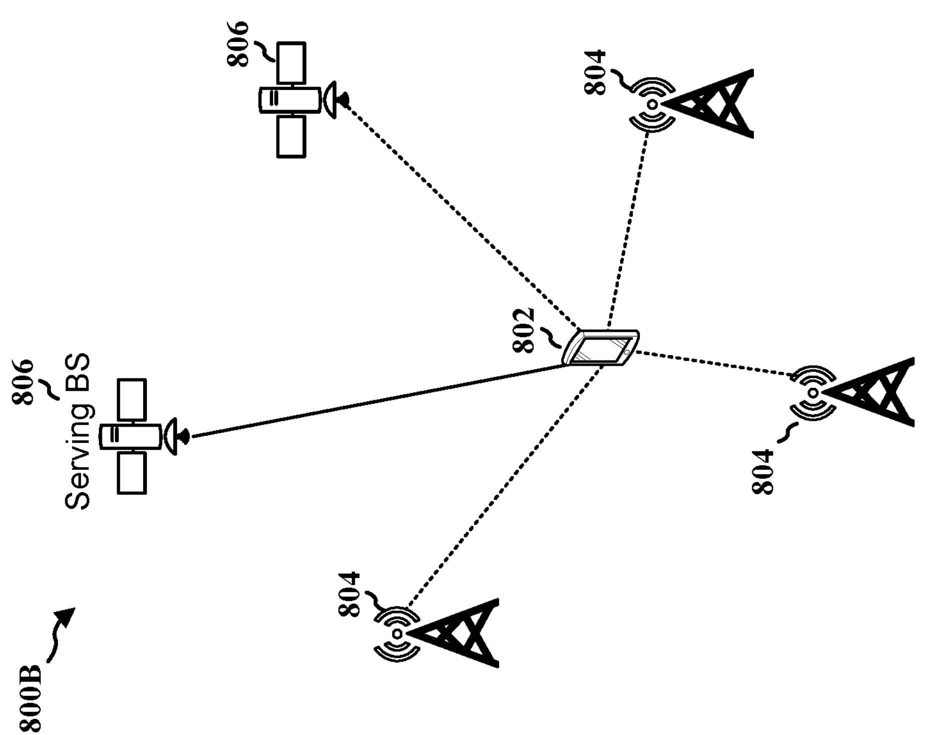
FIG. 8A is a diagram illustrating an example of a network that includes both NTN and terrestrial network (TN) devices in accordance with various aspects of the present disclosure.
FIG. 8B is a diagram illustrating an example of a network that includes both NTN and TN devices in accordance with various aspects of the present disclosure.

In some examples, a communication network may include both an NTN and a terrestrial network (TN). In other words, a segment of a communication network may include non-terrestrial device(s) (e.g., NTN base stations) and another segment of the communication work may include terrestrial device(s) (e.g., TN/ground base stations). For example, FIGS. 8A and 8B are diagrams 800A and 800B illustrating examples of a network that includes both NTN and TN devices in accordance with various aspects of the present disclosure. A network may include one or more TN devices 804 (e.g., ground base stations and/or TRPs) and one or more NTN devices 806 (e.g., satellites and/or aircrafts), where a UE 802 in a positioning session may transmit or receive signals (e.g., PRSs, SRSs, etc.) with both TN devices 804 and NTN devices 806. For purposes of the present disclosure, a positioning session may refer to an instance/session/activity in which the location/position of a UE is to be determined based on at least one positioning mechanism, such as the network-based positioning and/or the GNSS-based positioning as discussed in connection with FIG. 4. In some examples, as shown by the diagram 800A, a serving base station may be a TN base station, such that the UE 802 may connect to the serving base station via a TN network. In other examples, as shown by the diagram 800B, the serving base station may be an NTN satellite base station, such that the UE 802 may connect to the NTN satellite base station via an NTN network. In both scenarios, the assistance data (AD) associated with the UE positioning session may include a mixed of TN and NTN base stations. For purposes of the present disclosure, a base station that is associated with an NTN device (e.g., a satellite, an aircraft, or an UAS platform, etc.) may be referred to as an "NTN base station," an "NTN satellite base station," and/or an "NTN base station satellite." On the other hand, a base station that is located on the earth may be referred to as an "TN base station" and/or a "terrestrial base station."

Figure 9:
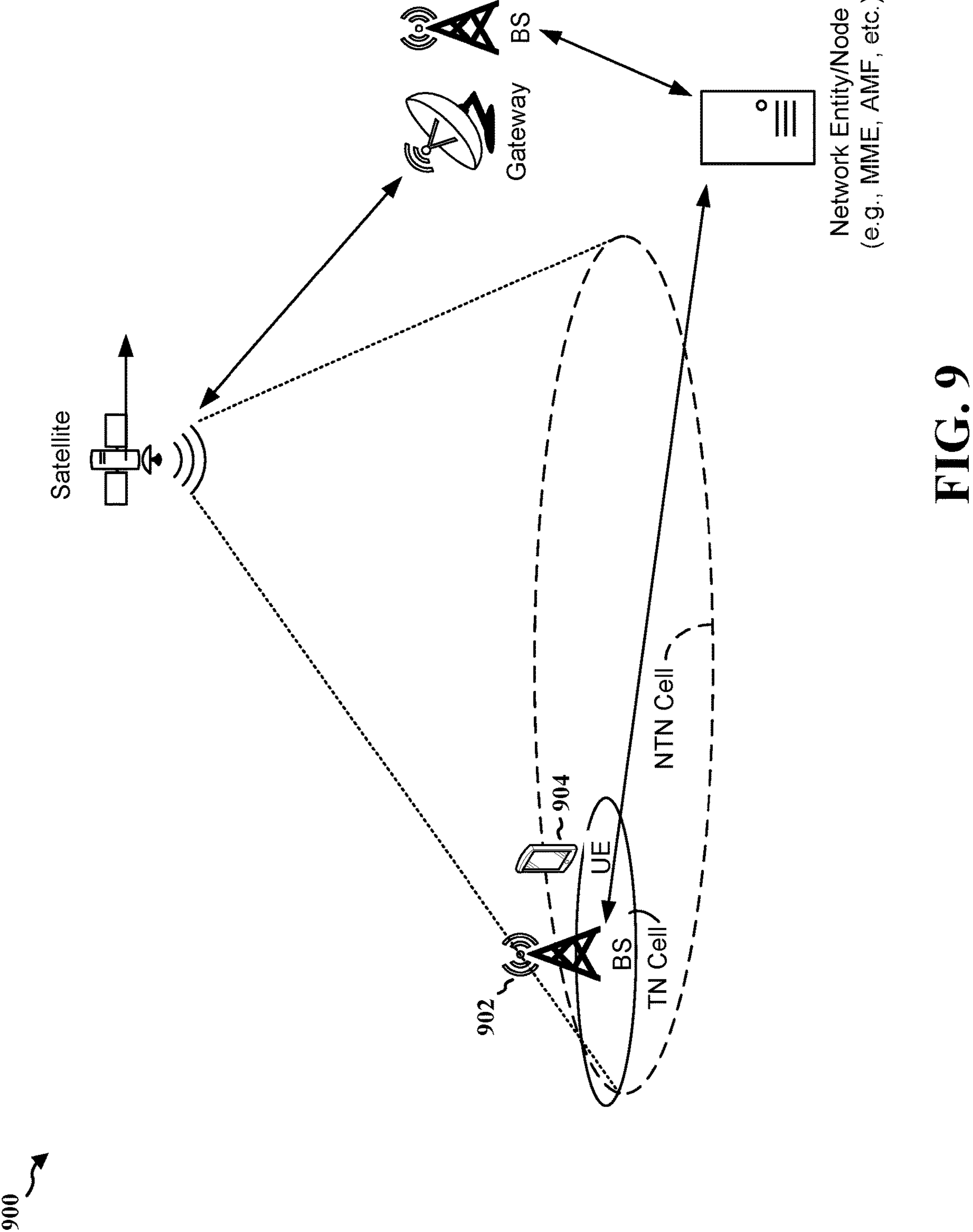
FIG. 9 is a diagram illustrating an example of a network entity/node supporting both TN and NTN systems in accordance with various aspects of the present disclosure.

FIG. 9 is a diagram 900 illustrating an example of a network entity/node supporting both TN and NTN systems in accordance with various aspects of the present disclosure. In some implementations, a network entity/node, such as the 4G mobility management entity (MME) and/or the 5G access and mobility management function (AMF), may have the capability to support both TN and NTN systems. In addition, as shown at 902, a base station (e.g., an eNB, a gNB, etc.) may also have the capability to support connection via both TN and satellites. However, in most/current implementations, a location server (e.g., a location management function (LMF)) may not know the NTN capabilities of a UE in such conditions. In some scenarios, a UE 904 may be configured with equivalent public land mobile networks (PLMNs) belonging to both TN and NTN. A PLMN may be configured to support both TN and NTN. Therefore, when the UE 904 goes into radio link failure (RLF)/suspended in one network (e.g., TN or NTN), the UE 904 may be able to continue connection in another network (e.g., TN and NTN). For example, if the UE 904 is suspended in a TN, the UE 904 may continue/resume its connection in an NTN.

In some scenarios, during a handover procedure and/or a radio resource control (RRC) reestablishment procedure between a TN and an NTN while there are one or more positioning sessions running (e.g., for determining the position of the UE 904), a location server may not have the capability information of the UE 904 (which may be referred to as the "UE capability/capabilities"). This is because the UE capability may be configured to belong to the network (e.g., TN or NTN) where the UE capability was reported (e.g., TN or NTN). In addition, in some examples, there may be high priority use cases that might specify the location server to play key roles to determine the location of the UE 904 (e.g., to determine the user location). Examples of high priority use cases may include emergency calls, emergency short message service (SMS), voice/data/SMS from high priority users or users who are charged at a higher rate, wireless emergency alerts (WEA) (e.g., ground network to satellite), and/or a lawful interception, etc. A lawful interception (LI) may refer to the facilities in telecommunications and telephone networks that allow law enforcement agencies with court orders or other legal authorization to selectively wiretap individual subscribers. This lawful interception may be mainly applicable for NTN services where some operators may not allow users and some may allow.

Aspects presented herein may improve the overall performance and efficiency for positioning when a UE has both TN and NTN capabilities. Aspects presented herein may enable a location server to obtain/know the NTN capabilities of a UE, which may be helpful when the UE camps on an NTN cell when there is no TN cell available. For example, with the help of the NTN capabilities of the UE, the location server may send updated assistance data (AD) to the UE for the UE to calculate its location, which may be achieved with LTE Positioning Protocol (LPP) and/or standalone sessions with a private or a third-party location server. In another example, when there is a sudden TN coverage loss happens at a UE or the UE is alone in emergency cases, the NTN capabilities of the UE may help the UE to determine its location standalone even if the NTN has spotty/weak coverage. In another example, intersatellite link (ISL) activation in high priority use cases may also be possible if the location server has the capability to know the NTN capabilities of a UE, as the location server may be able to determine the location of the UE and instruct a network (e.g., a 4G/5G core network) to activate nearby ISL satellite for immediate support. Knowing the NTN capabilities of a UE may be useful as a location server may be configured to be (always) in synchronization with the network (e.g., the 5G RAN and core network) so they may be aware of the NTN satellite position and when the next satellite comes into visibility. In another example, after exchanging NTN (real-time) information with a location server, a UE may be able to adjust its positioning capabilities (e.g., it may trim down or can expand). Then, based on the location server bandwidth and/or current NTN/TN scenario and capability, positioning session(s) may be leveraged as well (similar things which the UE may adopt). Aspects presented herein may also be helpful for an over-the-top (OTT) server as well as a network entity/node that works with NTN.

In one aspect of the present disclosure, a location server (e.g., an LMF) may be configured to obtain (or be aware of) a UE's NTN capabilities when at least one of the following conditions applies: (1) when the UE is in mobility (e.g., the UE is moving) and an RRC reconnection establishment occurs between a TN and an NTN during a positioning session of the UE; (2) when the UE has both TN and NTN dual connectivity (e.g., the UE is connecting to both TN and NTN) during one or more positioning sessions; (3) when the UE has at least one high priority use case such as emergency calls, emergency SMS, voice/data/SMS from high priority users or users who are charged at a higher rate, wireless emergency alerts (WEA) (ground network to satellite), lawful interception, etc., (4) when the UE has better visibilities/connections for NTN base stations compared to TN base stations, and/or (5) when the mobile carrier of the UE has limited TN coverage for an area but also provides NTN coverage for that area, etc.

In another aspect of the present disclosure, example NTN capabilities of the UE that may be shared with or available to the location server (e.g., when at least one of the above conditions applies/is triggered) may include, and is not limited to, (i) NTN band supported, (ii) NTN cell camped information (e.g., real time or store-and-forward operation mode), (iii) NTN cell type (e.g., LEO, MEO, GEO, or HAPS, etc.), (iv) NTN PLMN, (v) whether the UE has/supports TN and NTN dual connectivity or has/supports just TN, (vi) number of simultaneous NTN satellite connections supported (e.g., to enable the location server to determine how many NTN satellites may be configured for the UE), (vii) number of simultaneous NTN satellite signals that may be processed, (viii) delays associated with NTN communications (e.g., for improving the accuracy of the positioning), or a combination thereof. Other NTN device capabilities that may be helpful for the location server or the OTT server may also be included in the example NTN capabilities of the UE that may be shared with or available to the location server. In some implementations, a location server may obtain NTN capabilities of a UE based on signaling with a network entity (e.g., a 5G AMF server) via a positioning protocol (e.g., NR positioning protocol A (NRPPa) protocol). In some implementations, a location server may obtain NTN capabilities of a UE from the UE via a positioning protocol (e.g., LPP protocol). In other words, the UE may be configured to share its NTN capabilities directly with the location server via the LPP protocol. By obtaining NTN capabilities of the UE directly from the UE, the location server may obtain all fresh and most updated information from the UE related to the NTN cell, and accordingly take decision(s) to improve positioning.

Figure 10A:
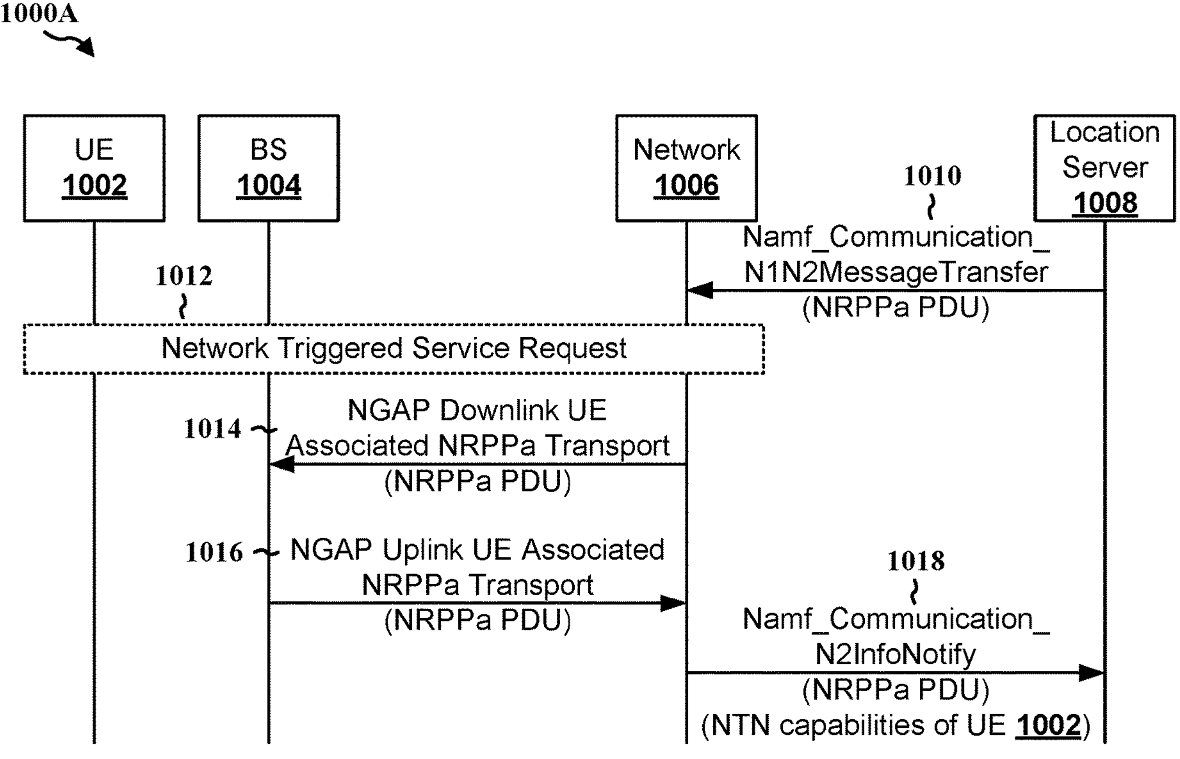
FIG. 10A is a diagram illustrating an example of a location server obtaining NTN capabilities of a UE via a network entity in accordance with various aspects of the present disclosure.

FIG. 10A is a diagram 1000A illustrating an example of a location server obtaining NTN capabilities of a UE via a network entity in accordance with various aspects of the present disclosure. In one aspect, a location server 1008 (e.g., an LMF) may be configured to start signaling with a network entity/node 1006 (e.g., an MME, an AMF, etc.) via a positioning protocol (e.g., an LPP protocol, an NRPPa protocol, etc.) to obtain NTN capabilities of a UE 1002. In some examples, as the network entity/node 1006 may have already stored TN/NTN capabilities of the UE 1002 at the time of initial attach (e.g., when the UE 1002 is connected to a serving base station 1004) or later based on an RRC mobility/RRC re-establishment. For example, the network entity/node 1006 may have NTN capabilities of the UE 1002 with regards to the band combinations, carrier aggregation (CA) combination, channel bandwidth support, NTN limitation for specified UEs/devices (e.g., for reduced capability (RedCap) devices), or other related information, etc., where the network entity/node 1006 may obtain the NTN capabilities of the UE 1002 via an RRC UE capability information message (or a UE context information message) in uplink (UL) direction. However, in some scenarios, certain real-time NTN information associated with the UE 1002 may still be unavailable to the location server 1008, such as the NTN serving cell (e.g., which NTN cell is currently serving the UE 1002), the NTN cell type, and some real-time parameters like dual connectivity (TN/NTN) and whether serving satellite is working in a store and forward mode or in a default mode.

As an illustration, aspects described in connection with 1010, 1012, and 1014 may be triggered when the location server 1008 is specified/configured to send an NRPPa message to the serving base station 1004 (e.g., an NG-RAN node) for the UE 1002 (which may be referred to as a target UE in some examples) as part of an NRPPa positioning activity (or an NRPPa positioning session). For example, at 1010, the location server 1008 may invoke a Namf_Communication_N1N2MessageTransfer service operation towards the network entity/node 1006 to request the transfer of a NRPPa PDU to the serving base station 1004 for the UE 1002. The service operation may include the NRPPa PDU together with a location service (LCS) correlation ID (e.g., in an N2 message container).

At 1012, if the UE 1002 is in an idle state (e.g., if the network connection was previously released due to data and signaling inactivity), the network entity/node 1006 may perform a network triggered service request in order to establish a signalling connection with the UE 1002 and assign a serving base station.

At 1014, the network entity/node 1006 may forward an NRPPa protocol data unit (PDU) to the serving base station in an NGAP downlink UE associated NRPPa transport message over the network signalling connection corresponding to the UE 1002 and may include the routing ID related to the location server 1008. The network entity/node 1006 may not be specified to retain state information for this transfer (e.g., network entity/node 1006 may treat any response described in 1016 as a separate non-associated transfer).

Aspects described in connection with 1016 and 1018 may be triggered when a serving base station (e.g., the serving base station 1004) is specified/configured to send an NRPPa message to the location server 1008 for a target UE (e.g., the UE 1002) as part of an NRPPa positioning activity/session. For example, at 1016, the serving base station 1004 may then send an NRPPa PDU to the network entity/node 1006 in an NGAP uplink UE associated NRPPa transport message and includes the routing ID received in 1014.

At 1018, the network entity/node 1006 may invoke the Namf_Communication_N2InfoNotify service operation towards the location server 1008 indicated by the routing ID received in 1016. The service operation may include the NRPPa PDU received in 1016 together with the LCS correlation ID in an N2 information container. Aspects described between 1010 to 1018 may be repeated. In addition, at 1018, the location server 1008 may also receive, from the network entity/node 1006, NTN capabilities of the UE 1002, such as the band combinations, CA combination, channel bandwidth support, NTN limitation for specified UEs/devices, and/or other related information, etc. For example, an LMF may receive NTN capabilities of a UE from a network entity (e.g., an AMF) based on the NRPPa protocol as positioning and data acquisition transactions between the LMF and an NG-RAN node may be modelled by using procedures of the NRPPa protocol. There may be two types of NRPPa procedures: (1) UE associated procedure-transfer of information for a particular UE, including the procedures supporting the Positioning Information Transfer, E-CID Location Information Transfer and Measurement Preconfiguration Information Transfer functions; and (2) non UE associated procedure-transfer of information applicable to the NG-RAN node and associated TRP, including the procedures supporting the OTDOA Information Transfer, Assistance Information Transfer, TRP Information Transfer, Measurement Information Transfer and PRS Information Transfer functions. In some examples, for location information transfer, the LMF may send a request for location related information to the NG-RAN node, and indicates the type of location information specified, where the request may refer to a particular UE. In response, the NG-RAN node may transfer location related information to the LMF. The location related information transferred may be specified to match the location related information requested. In addition, if requested by the LMF, the NG-RAN node may also transfer additional location related information to the LMF in one or more additional NRPPa messages. As such, the location server 1008 may also receive, from the network entity/node 1006, NTN capabilities of the UE 1002 via at least one of these signaling. Note in some scenarios, the AMF may have already stored the NTN capabilities of the UE 1002 during the initial attach (e.g., when the UE 1002 initially connects to the serving base station 1004) or later based on RRC reconfiguration (e.g., after the UE 1002 is connected to the serving base station 1004). Thus, the location server 1008 may fetch the NTN capabilities of the UE 1002 based on at least one of these instances.

In some examples, the location server 1008 may be configured to receive an indication of the UE 1002 camping on an NTN cell when: (1) an RRC reconnection is established for the UE 1002 between a TN and an NTN during a positioning session, (2) the UE 1002 has both TN connectivity and NTN connectivity during the positioning session, and/or (3) the UE 1002 has at least one high priority task, etc. For purposes of the present disclosure, "camp/camping" may refer to a UE/device associating with a wireless network or cell. For example, when a UE camps on a network, it may refer that the UE has established a connection (and may be actively communicating with) that network.

Then, based on the indication and/or the NTN capabilities of the UE 1002, the location server 1008 may configure assistance data (AD) or update the AD for the UE 1002 (e.g., to optimize the positioning of the UE 1002). For example, during a network-based GNSS positioning session, if the location server 1008 and/or the serving base station 1004 determine that the UE 1002 may have better visibility to NTN satellites compared to ground base stations (e.g., the UE 1002 is at a high mountain or an area with scarce ground base stations/TRPs), the location server 1008 (e.g., which may be based on an indication/request from the serving base station 1004) may provide NTN satellite information (e.g., via downlink assistance data) to the UE 1002 (e.g., via the serving base station 1004). Then, based on the NTN satellite information, the UE 1002 may acquire a set of NTN satellites for the communication/positioning. In other words, after knowing/learning the NTN capabilities of the UE 1002, the location server 1008 may enhance its AD. In another example, if the location server 1008 it not aware of the NTN capabilities of the UE 1002, the location server 1008 may be specified to request such information from other entities first (e.g., the serving base station 1004) or configure a list of NTN satellites that may be potentially supported by the UE 1002 (e.g., for UE 1002 to select or determine which NTN satellites to use).

For example, after the location server is aware of the NTN band(s) supported by the UE 1002, the location server 1008 may configure AD that just focuses/includes on the NTN band(s) supported by the UE 1002 to make the acquisition of NTN satellites more efficient for the UE 1002 (e.g., the AD may exclude NTN band(s) not supported by the UE 1002). Similarly, by knowing the NTN cell type supported by the UE, the location server 1008 may configure AD that just focuses/includes on types of satellites supported by the UE 1002 to make the acquisition of NTN satellites more efficient for the UE 1002. In another example, the NTN cell camped information (e.g., real time or store and/or forward operation mode) may enable the location server 1008 to perform a more efficiently manage operations related to NTN cells, such as how an NTN serving cell may assist the UE 1002 with making data connection for LPP secure user plane (SUPL) positioning where data pipe line is specified, and also enabling some quick assistance during an emergency call or text message, etc. In another example, by knowing NTN PLMN related to the UE 1002, the location server 1008 may be able to configure more accurate and/or efficient assistance data for the UE 1002 by determining cell boundaries for the UE 1002 (e.g., the AD may focus on configurations that are valid within the cell boundaries), which may be helpful when the TN and NTN are owned/operated by the same entity (e.g., by the same operator). In another example, by knowing whether the UE 1002 has the TN/NTN dual connectivity (or just TN connectivity) in advance, the location server may determine whether to include NTN related configurations in the assistance data to improve the latency of the NTN configuration (e.g., to reduce number of signaling between entities). In another example, if the location server 1008 is aware of the number of simultaneous NTN satellite connections supported by the UE 1002 and/or the number of simultaneous NTN satellite signals that may be processed by the UE 1002, the location server 1008 may configure more precise assistance data that is able to be processed/performed by the UE 1002, thereby making the UE positioning more accurate. In some examples, the location server 1008 may also use the delay information associated with NTN communications (or related to the UE 1002) to improving the accuracy of the positioning, such as by taking these delay(s) into consideration when determining/estimating the location of the UE 1002.

Figure 10B:
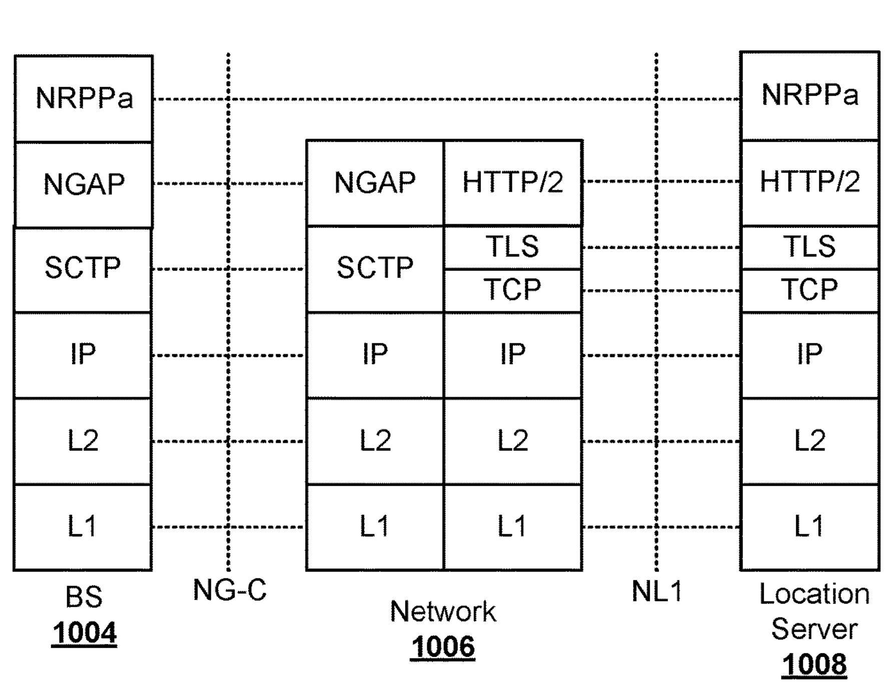
FIG. 10B is a diagram illustrating an example protocol layering for location server to serving base station signaling in accordance with various aspects of the present disclosure.

FIG. 10B is a diagram 1000B illustrating an example protocol layering for location server to serving base station signaling in accordance with various aspects of the present disclosure. In some scenarios, the NRPPa protocol may be transparent to the network entity/node 1006 (e.g., the AMF). The network entity/node 1006 may route the NRPPa PDUs transparently based on a routing ID which corresponds to the involved location server 1008 over a network interface (e.g., an NG interface) without knowledge of the involved NRPPa transaction. The network entity/node 1006 may carry the NRPPa PDUs over the network interface either in a UE associated mode or a non-UE associated mode.

Figure 11:
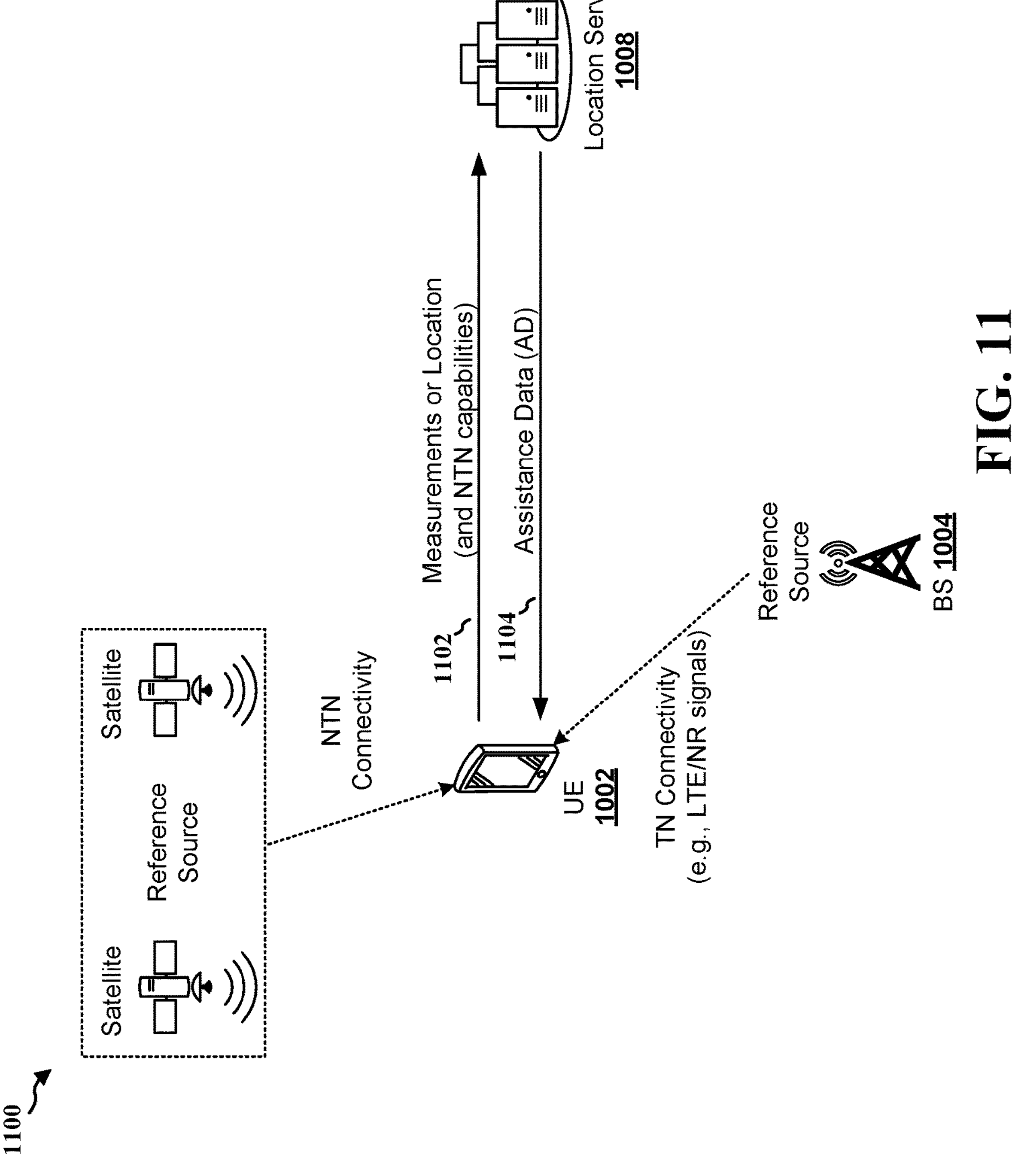
FIG. 11 is a diagram illustrating an example of a location server obtaining NTN capabilities of a UE directly from the UE in accordance with various aspects of the present disclosure.

FIG. 11 is a diagram 1100 illustrating an example of a location server obtaining NTN capabilities of a UE directly from the UE in accordance with various aspects of the present disclosure. In another aspect of the present disclosure, as shown at 1102, the UE 1002 may be configured to share its NTN capabilities with the location server 1008, such as based on a positioning protocol (e.g., LPP, NRPPa, etc.). In most implementations, a UE may be configured to send just TN cell information and its related positioning capabilities to a location server as part of positioning protocol call flow (e.g., a secure user plane location (SUPL) LPP call flow), which may include information such as observed time difference of arrival (OTDOA), enhanced cell identity (ECID), multi-cell round-trip-time (MC-RTT), angle-of-arrival (AoA), etc. However, by enabling the UE 1002 to share its NTN capabilities (directly) with the location server 1008, the UE 1002 may provide additional NTN related information to the location server 1008 such as NTN band(s) supported, NTN cell camped information (real time or store and forward operation mode), NTN cell Type (e.g., LEO, MEO, GEO, HAPS, etc.), NTN PLMN, whether UE 1002 has TN/NTN dual connectivity or just TN, or a combination thereof.

At 1104, based on the NTN capabilities provided by the UE 1002, the location server 1008 may configure and transmit corresponding assistance data (AD) that is most suitable for the UE 1002 (e.g., in real-time). Similarly, in some examples, the UE 1002 may be configured to camp on an NTN cell (and notify or transmit an indication to the location server 1008) when: (1) an RRC reconnection is established for the UE 1002 between a TN and an NTN during a positioning session, (2) the UE 1002 has both TN connectivity and NTN connectivity during the positioning session, and/or (3) the UE 1002 has at least one high priority task, etc. After the UE 1002 camps on the NTN cell (and the location server 1008 receives the indication of the UE 1002 camping on the NTN cell), the location server 1008 may configure AD or update the AD for the UE 1002 based on the indication and/or the NTN capabilities of the UE 1002 (e.g., to optimize the positioning of the UE 1002). For example, as discussed in connection with FIG. 10A, the location server 1008 may be able to configure more suitable NTN satellites for the UE 1002 based on the NTN capabilities of the UE 1002 (e.g., prioritizing configuring NTN satellites and/or NTN bands supported by the UE 1002). Then, the UE 1002 may initiate or resuming the positioning session based on the updated AD.

Aspects presented herein are directed to protocols/configurations for a location server to be informed of a UE's NTN capabilities under certain conditions (e.g., RRC reconnection establishment happens between TN and NTN network during positioning session(s), the UE has both TN and NTN dual connectivity during positioning session(s), the UE has high priority use cases, etc.). NTN capabilities of the UE reported to the location server may include the following: NTN Band supported; NTN cell camped information (Real time or Store & Forward Operation mode); NTN cell Type: LEO or MEO or GEO or HAPS; NTN PLMN; whether device has TN/NTN dual connectivity or just TN, etc. Signaling regarding UE capabilities may be accomplished using the following protocols: 1) LMF server can start signaling with 5G AMF server via NRPPa protocol and can get device NTN capabilities; 2) UE can share its NTN capabilities directly with location server via LTE/NR protocol (e.g., LPP). By this method, location server may get all fresh updated information from UE about NTN cell and accordingly can make decision regarding positioning based on UE NTN reported capabilities.

Aspects presented herein may enable location server to know NTN capabilities of device and it might helpful when UE camped on NTN cell when there is no TN cell available and with the help of device NTN capability, location server might send updated assistance data and then UE can calculate its location. This might be possible with LPP protocol or standalone sessions with any private or third-party location server. When sudden TN coverage loss happens, or UE find alone in emergency cases these NTN capabilities might help for UE to determine location standalone even in NTN spotty coverage. Another way of help is inter-satellite link activation in high priority uses cases also possible if location server can get to know device NTN capabilities. Location server may be able to determine device location and instruct to 5G core network to activate nearby ISL satellite for immediate support. Above is useful because location server is in synchro with 5GRAN and core network so they might aware the NTN satellite position and when the next satellite comes in visibility. The most important use case is-after exchanging NTN real time info with location server, the UE can adjust its positioning capabilities (some may trim down or expand). Based on location server bandwidth and current NTN/TN scenario and capability-positioning sessions might be leveraged as well. The same things UE can adopt. Aspects presented herein might be helpful for OTT server as well who works with NTN 5G or 6G.

Figure 12:
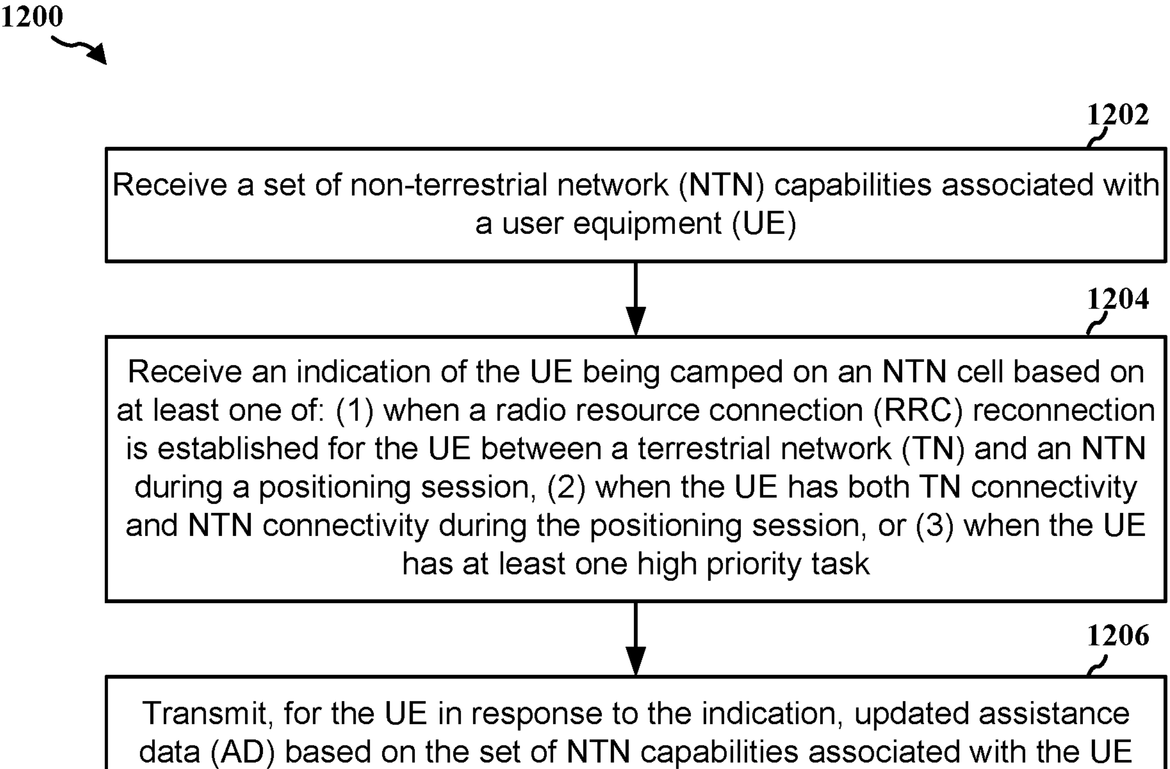
FIG. 12 is a flowchart of a method of wireless communication.

FIG. 12 is a flowchart 1200 of a method of wireless communication. The method may be performed by a network entity (e.g., the one or more location servers 168; the location server 1008; the network entity 1360). The method may enable the network entity to obtain/know the NTN capabilities of a UE, which may be helpful when the UE camps on an NTN cell when there is no TN cell available.

At 1202, the network entity may receive a set of NTN capabilities associated with a UE, such as described in connection with FIGS. 10A, 10B, and 11. For example, as described in connection with 1018 of FIG. 10A, at 1018, the location server 1008 may also receive, from the network entity/node 1006, NTN capabilities of the UE 1002, such as the band combinations, CA combination, channel bandwidth support, NTN limitation for specified UEs/devices, and/or other related information, etc. The reception of the set of NTN capabilities may be performed by, e.g., the UE NTN capability obtainment component 197, the network processor(s) 1312, and/or the network interface 1380 of the network entity 1360 in FIG. 13.

At 1204, the network entity may receive an indication of the UE being camped on an NTN cell based on at least one of: (1) when an RRC reconnection is established for the UE between a TN and an NTN during a positioning session, (2) when the UE has both TN connectivity and NTN connectivity during the positioning session, or (3) when the UE has at least one high priority task, such as described in connection with FIGS. 10A, 10B, and 11. For example, as described in connection with 1018 of FIG. 10A, the location server 1008 may be configured to receive an indication of the UE 1002 camping on an NTN cell when: (1) an RRC reconnection is established for the UE 1002 between a TN and an NTN during a positioning session, (2) the UE 1002 has both TN connectivity and NTN connectivity during the positioning session, and/or (3) the UE 1002 has at least one high priority task, etc. The reception of the indication may be performed by, e.g., the UE NTN capability obtainment component 197, the network processor(s) 1312, and/or the network interface 1380 of the network entity 1360 in FIG. 13.

At 1206, the network entity may transmit, for the UE in response to the indication, updated AD based on the set of NTN capabilities associated with the UE, such as described in connection with FIGS. 10A, 10B, and 11. For example, as described in connection with 1018 of FIG. 10A, based on the indication and/or the NTN capabilities of the UE 1002, the location server 1008 may configure AD or update the AD for the UE 1002 (e.g., to optimize the positioning of the UE 1002). The transmission of the updated AD may be performed by, e.g., the UE NTN capability obtainment component 197, the network processor(s) 1312, and/or the network interface 1380 of the network entity 1360 in FIG. 13.

In one example, the set of NTN capabilities includes one or more of: a supported NTN band, NTN cell camped information, an NTN cell type, an NTN public land mobile network (PLMN), or a support for dual TN and NTN connectivity.

In another example, the at least one high priority task includes at least one of: an emergency call, an emergency short message service (SMS), a voice message, a data message, or an SMS message from a high priority user, WEA, or a lawful interception.

In another example, to receive the set of NTN capabilities, the network entity may be configured receive, from an access and mobility management function (AMF), the set of NTN capabilities. In some implementations, to receive, from the AMF, the set of NTN capabilities, the network entity may be configured to receive, from the AMF, the set of NTN capabilities based on a positioning protocol.

In another example, to receive the set of NTN capabilities, the network entity may be configured to receive, from the UE, the set of NTN capabilities. In some implementations, to receive, from the UE, the set of NTN capabilities, the network entity may be configured to receive, from the UE, the set of NTN capabilities based on a positioning protocol.

In another example, to transmit the updated AD, the network entity may be configured to transmit the updated AD via the NTN.

In another example, the location server may be a location management function (LMF).

Figure 13:
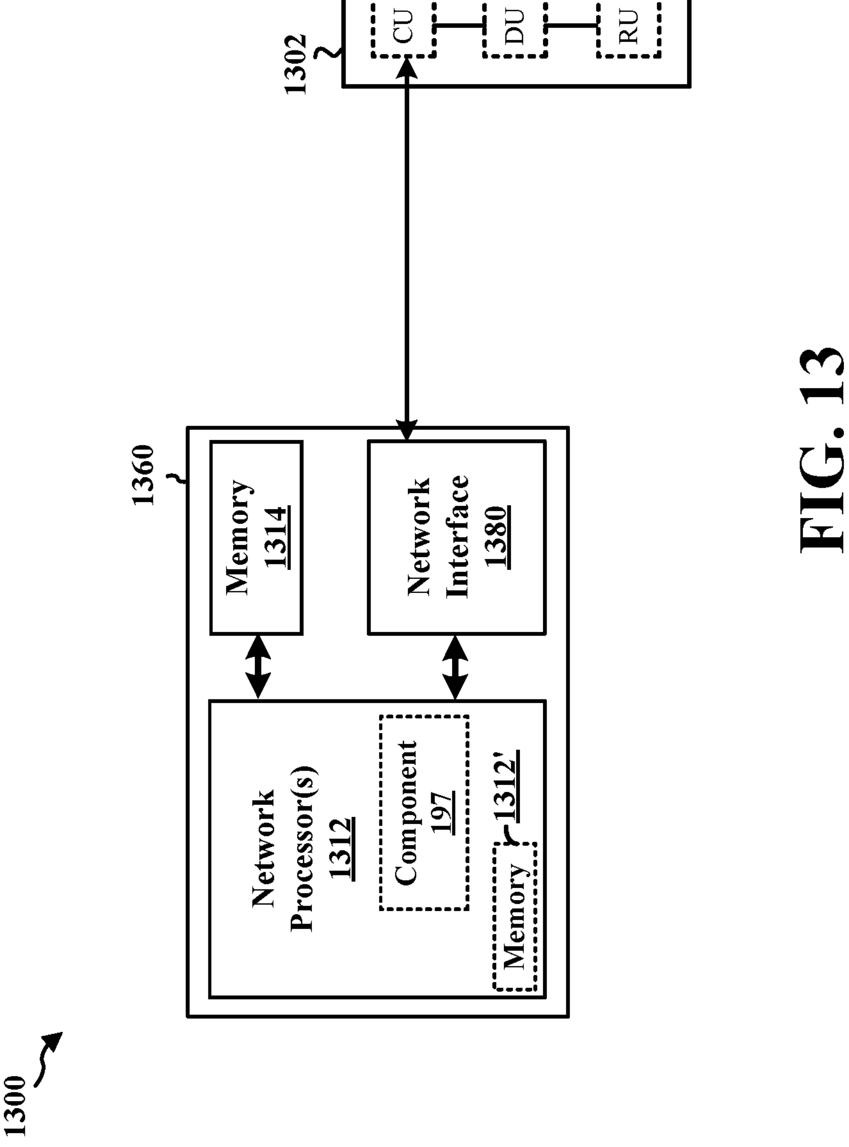
FIG. 13 is a diagram illustrating an example of a hardware implementation for an example network entity.

FIG. 13 is a diagram 1300 illustrating an example of a hardware implementation for a network entity 1360. In one example, the network entity 1360 may be within the core network 120. The network entity 1360 may include at least one network processor 1312. The network processor(s) 1312 may include on-chip memory 1312'. In some aspects, the network entity 1360 may further include additional memory modules 1314. The network entity 1360 communicates via the network interface 1380 directly (e.g., backhaul link) or indirectly (e.g., through a RIC) with the CU 1302. The on-chip memory 1312' and the additional memory modules 1314 may each be considered a computer-readable medium/memory. Each computer-readable medium/memory may be non-transitory. The network processor(s) 1312 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the UE NTN capability obtainment component 197 may be configured to receive a set of NTN capabilities associated with a UE. The UE NTN capability obtainment component 197 may also be configured to receive an indication of the UE being camped on an NTN cell based on at least one of: (1) when an RRC reconnection is established for the UE between a TN and an NTN during a positioning session, (2) when the UE has both TN connectivity and NTN connectivity during the positioning session, or (3) when the UE has at least one high priority task. The UE NTN capability obtainment component 197 may also be configured to transmit, for the UE in response to the indication, updated AD based on the set of NTN capabilities associated with the UE. The UE NTN capability obtainment component 197 may be within the network processor(s) 1312. The UE NTN capability obtainment component 197 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1360 may include a variety of components configured for various functions. In one configuration, the network entity 1360 may include means for receiving a set of NTN capabilities associated with a UE. The network entity 1360 may further include means for receiving an indication of the UE being camped on an NTN cell based on at least one of: (1) when an RRC reconnection is established for the UE between a TN and an NTN during a positioning session, (2) when the UE has both TN connectivity and NTN connectivity during the positioning session, or (3) when the UE has at least one high priority task. The network entity 1360 may further include means for transmitting, for the UE in response to the indication, updated AD based on the set of NTN capabilities associated with the UE.

In one configuration, the set of NTN capabilities includes one or more of: a supported NTN band, NTN cell camped information, an NTN cell type, an NTN PLMN, or a support for dual TN and NTN connectivity.

In another configuration, the at least one high priority task includes at least one of: an emergency call, an SMS, a voice message, a data message, or an SMS message from a high priority user, WEA, or a lawful interception.

In another configuration, the means for receiving the set of NTN capabilities may include configuring the network entity to receive, from an AMF, the set of NTN capabilities. In some implementations, to receive, from the AMF, the set of NTN capabilities, the network entity may be configured to receive, from the AMF, the set of NTN capabilities based on a positioning protocol.

In another configuration, the means for receiving the set of NTN capabilities may include configuring the network entity to receive, from the UE, the set of NTN capabilities. In some implementations, to receive, from the UE, the set of NTN capabilities, the network entity may be configured to receive, from the UE, the set of NTN capabilities based on a positioning protocol.

In another configuration, the means for transmitting the updated AD may include configuring the network entity to transmit the updated AD via the NTN.

In another configuration, the location server may be an LMF.

The means may be the UE NTN capability obtainment component 197 of the network entity 1360 configured to perform the functions recited by the means.

Figure 14:
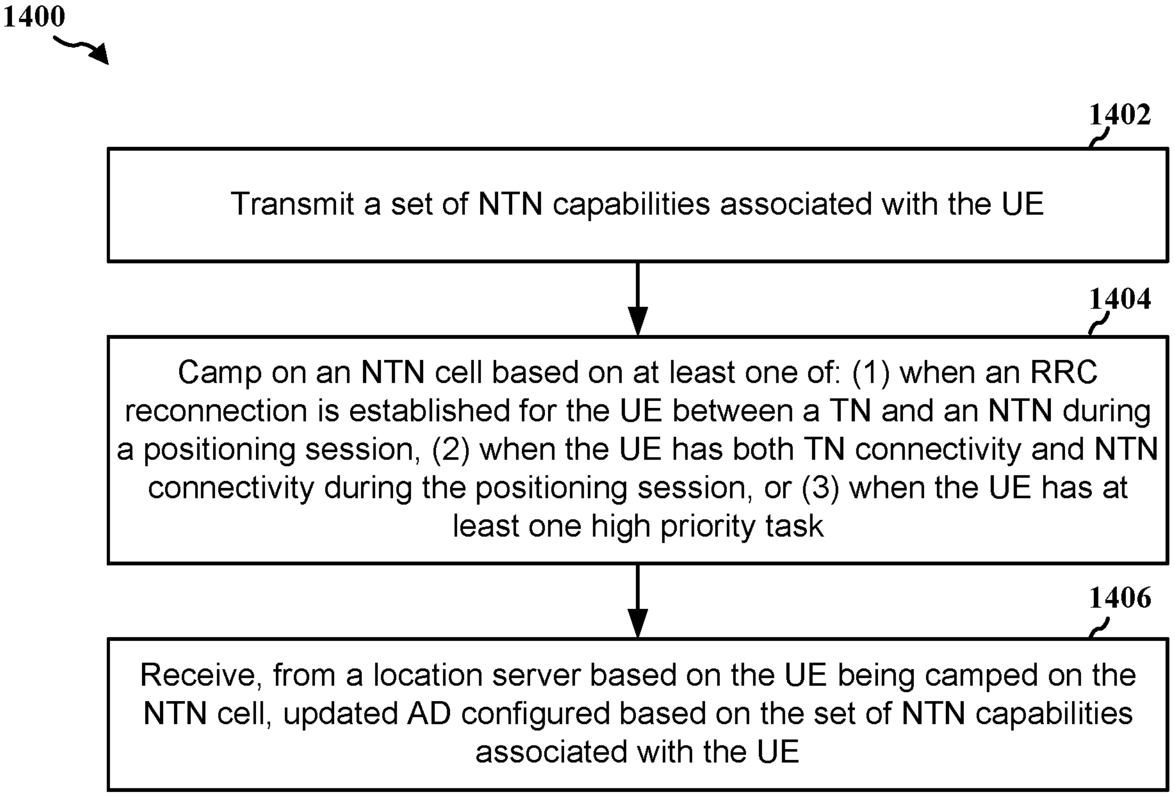
FIG. 14 is a flowchart of a method of wireless communication.

FIG. 14 is a flowchart 1400 of wireless communication at a user equipment (UE). The method may be performed by a UE (e.g., the UE 104, 404, 610, 802, 904, 1002; the GNSS device 506; the apparatus 1504). The method may enable the UE to provide its NTN capabilities to a location server to improve the overall performance and efficiency for UE positioning.

At 1402, the UE may transmit a set of NTN capabilities associated with the UE, such as described in connection with FIG. 11. For example, as shown at 1102, the UE 1002 may be configured to share its NTN capabilities with the location server 1008, such as based on a positioning protocol (e.g., LPP, NRPPa, etc.). The transmission of the set of NTN capabilities may be performed by, e.g., the NTN capability indication component 198, the SPS module 1516, the transceiver(s) 1522, the cellular baseband processor(s) 1524, and/or the application processor(s) 1506 of the apparatus 1504 in FIG. 15.

At 1404, the UE may camp on an NTN cell based on at least one of: (1) when an RRC reconnection is established for the UE between a TN and an NTN during a positioning session, (2) when the UE has both TN connectivity and NTN connectivity during the positioning session, or (3) when the UE has at least one high priority task, such as described in connection with FIG. 11. For example, the UE 1002 may be configured to camp on an NTN cell when: (1) an RRC reconnection is established for the UE 1002 between a TN and an NTN during a positioning session, (2) the UE 1002 has both TN connectivity and NTN connectivity during the positioning session, and/or (3) the UE 1002 has at least one high priority task, etc. The camping may be performed by, e.g., the NTN capability indication component 198, the SPS module 1516, the transceiver(s) 1522, the cellular baseband processor(s) 1524, and/or the application processor(s) 1506 of the apparatus 1504 in FIG. 15.

At 1406, the UE may receive, from a location server based on the UE being camped on the NTN cell, updated AD configured based on the set of NTN capabilities associated with the UE, such as described in connection with FIG. 11. For example, after the UE 1002 camps on the NTN cell (and the location server 1008 receives the indication of the UE 1002 camping on the NTN cell), the location server 1008 may configure AD or update the AD for the UE 1002 based on the indication and/or the NTN capabilities of the UE 1002 (e.g., to optimize the positioning of the UE 1002). The reception of the updated AD may be performed by, e.g., the NTN capability indication component 198, the SPS module 1516, the transceiver(s) 1522, the cellular baseband processor(s) 1524, and/or the application processor(s) 1506 of the apparatus 1504 in FIG. 15.

In one example, the set of NTN capabilities includes one or more of: a supported NTN band, NTN cell camped information, an NTN cell type, an NTN PLMN, or a support for dual TN and NTN connectivity.

In another example, the at least one high priority task includes at least one of: an emergency call, an emergency SMS, a voice message, a data message, or an SMS message from a high priority user, WEA, or a lawful interception.

In another example, to transmit the set of NTN capabilities, the UE may be configured to transmit, to an AMF, the set of NTN capabilities. In some implementations, to transmit, to the AMF, the set of NTN capabilities, the UE may be configured to transmit, to the AMF, the set of NTN capabilities based on a positioning protocol or based on an RRC mobility or an RRC re-establishment procedure.

In another example, to transmit the set of NTN capabilities, the UE may be configured to transmit, to the location server, the set of NTN capabilities. In some implementations, to transmit, to the location server, the set of NTN capabilities, the UE may be configured to transmit, to the location server, the set of NTN capabilities based on a positioning protocol.

In another example, to receive the updated AD, the UE may be configured to receive the updated AD via the NTN.

In another example, the location server may be an LMF.

In another example, the UE may initiate or resume the positioning session based on the updated AD.

Figure 15:
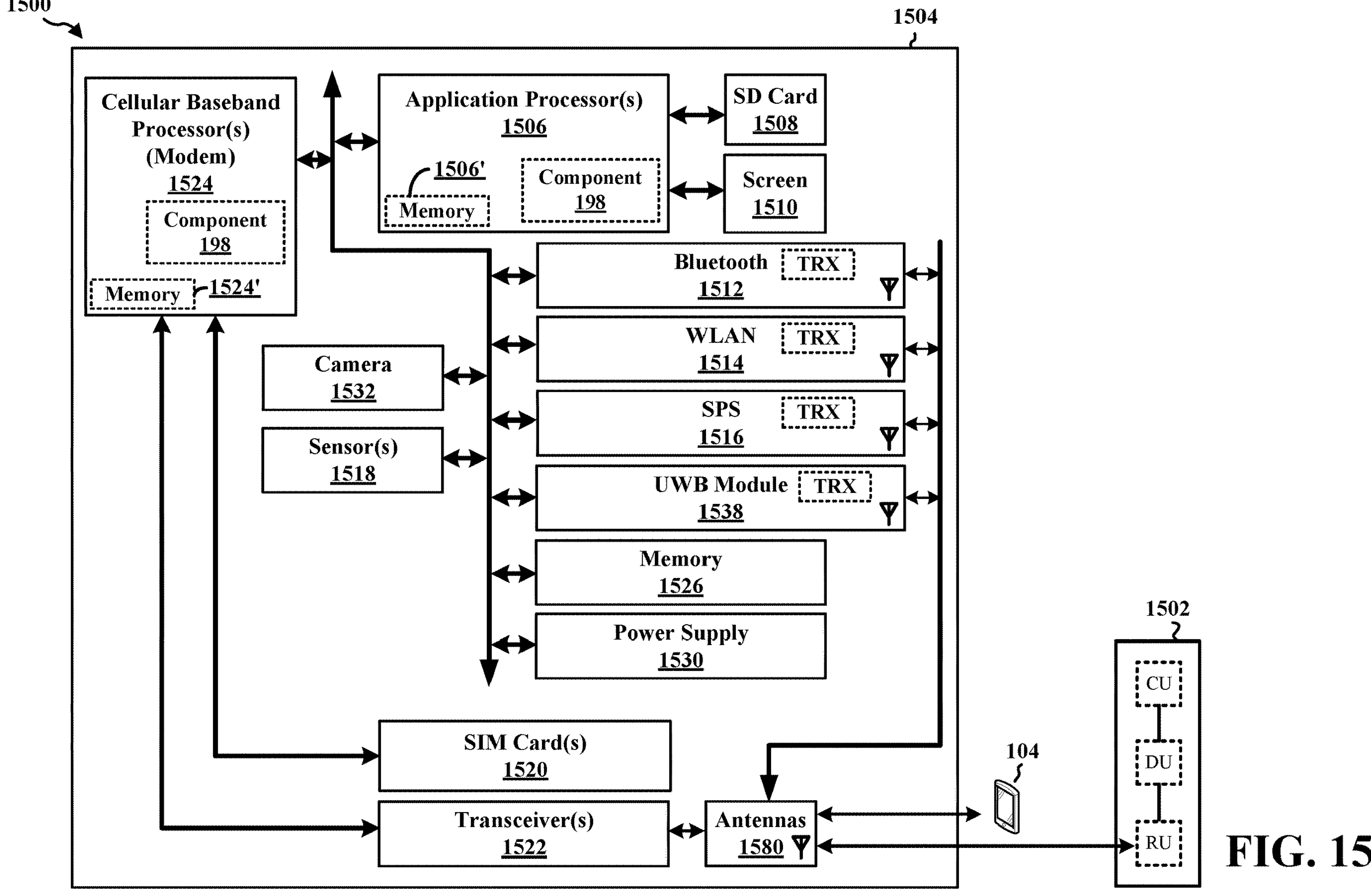
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include at least one cellular baseband processor 1524 (also referred to as a modem) coupled to one or more transceivers 1522 (e.g., cellular RF transceiver). The cellular baseband processor(s) 1524 may include at least one on-chip memory 1524'. In some aspects, the apparatus 1504 may further include one or more subscriber identity modules (SIM) cards 1520 and at least one application processor 1506 coupled to a secure digital (SD) card 1508 and a screen 1510. The application processor(s) 1506 may include on-chip memory 1506'. In some aspects, the apparatus 1504 may further include a Bluetooth module 1512, a WLAN module 1514, an ultrawide band (UWB) module 1538 (e.g., a UWB transceiver), an SPS module 1516 (e.g., GNSS module), one or more sensors 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the UWB module 1538, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor(s) 1524 communicates through the transceiver(s) 1522 via one or more antennas 1580 with the UE 104 and/or with an RU associated with a network entity 1502. The cellular baseband processor(s) 1524 and the application processor(s) 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor(s) 1524 and the application processor(s) 1506 are each responsible for general processing, including the execution of software stored on the computer-readable medium/memory. The software, when executed by the cellular baseband processor(s) 1524/application processor(s) 1506, causes the cellular baseband processor(s) 1524/application processor(s) 1506 to perform the various functions described supra. The cellular baseband processor(s) 1524 and the application processor(s) 1506 are configured to perform the various functions described supra based at least in part of the information stored in the memory. That is, the cellular baseband processor(s) 1524 and the application processor(s) 1506 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1524/application processor(s) 1506 when executing software. The cellular baseband processor(s) 1524/application processor(s) 1506 may be a component of the UE 350 and may include the at least one memory 360 and/or at least one of the TX processor 368, the RX processor 356, and the controller/processor 359. In one configuration, the apparatus 1504 may be at least one processor chip (modem and/or application) and include just the cellular baseband processor(s) 1524 and/or the application processor(s) 1506, and in another configuration, the apparatus 1504 may be the entire UE (e.g., see UE 350 of FIG. 3) and include the additional modules of the apparatus 1504.

As discussed supra, the NTN capability indication component 198 may be configured to transmit a set of NTN capabilities associated with the apparatus 1504. The NTN capability indication component 198 may also be configured to camp on an NTN cell based on at least one of: (1) when an RRC reconnection is established for the apparatus 1504 between a TN and an NTN during a positioning session, (2) when the apparatus 1504 has both TN connectivity and NTN connectivity during the positioning session, or (3) when the apparatus 1504 has at least one high priority task. The NTN capability indication component 198 may also be configured to receive, from a location server based on the apparatus 1504 being camped on the NTN cell, updated AD configured based on the set of NTN capabilities associated with the apparatus 1504. The NTN capability indication component 198 may be within the cellular baseband processor(s) 1524, the application processor(s) 1506, or both the cellular baseband processor(s) 1524 and the application processor(s) 1506. The NTN capability indication component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1504 may include a variety of components configured for various functions. In one configuration, the apparatus 1504, and in particular the cellular baseband processor(s) 1524 and/or the application processor(s) 1506, may include means for transmitting a set of NTN capabilities associated with the apparatus 1504. The apparatus 1504 may further include means for camping on an NTN cell based on at least one of: (1) when an RRC reconnection is established for the apparatus 1504 between a TN and an NTN during a positioning session, (2) when the apparatus 1504 has both TN connectivity and NTN connectivity during the positioning session, or (3) when the apparatus 1504 has at least one high priority task. The apparatus 1504 may further include means for receiving, from a location server based on the apparatus 1504 being camped on the NTN cell, updated AD configured based on the set of NTN capabilities associated with the apparatus 1504.

In one configuration, the set of NTN capabilities includes one or more of: a supported NTN band, NTN cell camped information, an NTN cell type, an NTN PLMN, or a support for dual TN and NTN connectivity.

In another configuration, the at least one high priority task includes at least one of: an emergency call, an emergency SMS, a voice message, a data message, or an SMS message from a high priority user, WEA, or a lawful interception.

In another configuration, the means for transmitting the set of NTN capabilities may include configuring the apparatus 1504 to transmit, to an AMF, the set of NTN capabilities. In some implementations, to transmit, to the AMF, the set of NTN capabilities may include configuring the apparatus 1504 to transmit, to the AMF, the set of NTN capabilities based on a positioning protocol or based on an RRC mobility or an RRC re-establishment procedure.

In another configuration, the means for transmitting the set of NTN capabilities may include configuring the apparatus 1504 to transmit, to the location server, the set of NTN capabilities. In some implementations, to transmit, to the location server, the set of NTN capabilities may include configuring the apparatus 1504 to transmit, to the location server, the set of NTN capabilities based on a positioning protocol.

In another configuration, the means for receiving the updated AD may include configuring the apparatus 1504 to receive the updated AD via the NTN.

In another configuration, the location server may be an LMF.

In another configuration, the apparatus 1504 may further include means for initiating or resuming the positioning session based on the updated AD.

The means may be the NTN capability indication component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a location server, comprising: receiving a set of non-terrestrial network (NTN) capabilities associated with a user equipment (UE); receiving an indication of the UE being camped on an NTN cell based on at least one of: (1) when a radio resource connection (RRC) reconnection is established for the UE between a terrestrial network (TN) and an NTN during a positioning session, (2) when the UE has both TN connectivity and NTN connectivity during the positioning session, or (3) when the UE has at least one high priority task; and transmitting, for the UE in response to the indication, updated assistance data (AD) based on the set of NTN capabilities associated with the UE.

Aspect 2 is the method of aspect 1, wherein the set of NTN capabilities includes one or more of: a supported NTN band, NTN cell camped information, an NTN cell type, an NTN public land mobile network (PLMN), or a support for dual TN and NTN connectivity.

Aspect 3 is the method of aspect 1 or aspect 2, wherein the at least one high priority task includes at least one of: an emergency call, an emergency short message service (SMS), a voice message, a data message, or an SMS message from a high priority user, WEA, or a lawful interception.

Aspect 4 is the method of any of aspects 1 to 3, wherein receiving the set of NTN capabilities comprises: receiving, from an access and mobility management function (AMF), the set of NTN capabilities.

Aspect 5 is the method of any of aspects 1 to 4, wherein receiving, from the AMF, the set of NTN capabilities comprises: receiving, from the AMF, the set of NTN capabilities based on a positioning protocol.

Aspect 6 is the method of any of aspects 1 to 5, wherein receiving the set of NTN capabilities comprises: receiving, from the UE, the set of NTN capabilities.

Aspect 7 is the method of any of aspects 1 to 6, wherein receiving, from the UE, the set of NTN capabilities comprises: receiving, from the UE, the set of NTN capabilities based on a positioning protocol.

Aspect 8 is the method of any of aspects 1 to 7, wherein transmitting the updated AD comprises: transmitting the updated AD via the NTN.

Aspect 9 is the method of any of aspects 1 to 8, wherein the location server is a location management function (LMF).

Aspect 10 is an apparatus for wireless communication at a location server, including: at least one memory; and at least one processor coupled to the at least one memory and, based at least in part on stored information that is stored in the at least one memory, the at least one processor, individually or in any combination, is configured to implement any of aspects 1 to 9.

Aspect 11 is the apparatus of aspect 10, further including at least one transceiver coupled to the at least one processor.

Aspect 12 is an apparatus for wireless communication at a location server including means for implementing any of aspects 1 to 9.

Aspect 13 is a computer-readable medium (e.g., a non-transitory computer-readable medium) storing computer executable code, where the code when executed by a processor causes the processor to implement any of aspects 1 to 9.

Aspect 14 is a method of wireless communication at a user equipment (UE), comprising: transmitting a set of non-terrestrial network (NTN) capabilities associated with the UE; camping on an NTN cell based on at least one of: (1) when a radio resource connection (RRC) reconnection is established for the UE between a terrestrial network (TN) and an NTN during a positioning session, (2) when the UE has both TN connectivity and NTN connectivity during the positioning session, or (3) when the UE has at least one high priority task; and receiving, from a location server based on the UE being camped on the NTN cell, updated assistance data (AD) configured based on the set of NTN capabilities associated with the UE.

Aspect 15 is the method of aspect 14, wherein the set of NTN capabilities includes one or more of: a supported NTN band, NTN cell camped information, an NTN cell type, an NTN public land mobile network (PLMN), or a support for dual TN and NTN connectivity.

Aspect 16 is the method of aspect 14 or aspect 15, wherein the at least one high priority task includes at least one of: an emergency call, an emergency short message service (SMS), a voice message, a data message, or an SMS message from a high priority user, WEA, or a lawful interception.

Aspect 17 is the method of any of aspects 14 to 16, wherein transmitting the set of NTN capabilities comprises: transmitting, to an access and mobility management function (AMF), the set of NTN capabilities.

Aspect 18 is the method of any of aspects 14 to 17, wherein transmitting, to the AMF, the set of NTN capabilities comprises: transmitting, to the AMF, the set of NTN capabilities based on a positioning protocol or based on a radio resource control (RRC) mobility or an RRC re-establishment procedure.

Aspect 19 is the method of any of aspects 14 to 18, wherein transmitting the set of NTN capabilities comprises: transmitting, to the location server, the set of NTN capabilities.

Aspect 20 is the method of any of aspects 14 to 19, wherein transmitting, to the location server, the set of NTN capabilities comprises: transmitting, to the location server, the set of NTN capabilities based on a positioning protocol.

Aspect 21 is the method of any of aspects 14 to 20, wherein receiving the updated AD comprises: receiving the updated AD via the NTN.

Aspect 22 is the method of any of aspects 14 to 21, wherein the location server is a location management function (LMF).

Aspect 23 is the method of any of aspects 14 to 22, further comprising: initiating or resuming the positioning session based on the updated AD.

Aspect 24 is an apparatus for wireless communication at a user equipment (UE), including: at least one memory; and at least one processor coupled to the at least one memory and, based at least in part on stored information that is stored in the at least one memory, the at least one processor, individually or in any combination, is configured to implement any of aspects 14 to 23.

Aspect 25 is the apparatus of aspect 24, further including at least one transceiver coupled to the at least one processor.

Aspect 26 is an apparatus for wireless communication at a user equipment (UE) including means for implementing any of aspects 14 to 23.

Aspect 27 is a computer-readable medium (e.g., a non-transitory computer-readable medium) storing computer executable code, where the code when executed by a processor causes the processor to implement any of aspects 14 to 23.

What is claimed is:

1. An apparatus for wireless communication at a location server, comprising:
- at least one memory; and
- at least one processor coupled to the at least one memory, the at least one processor is configured to:
  - receive a set of non-terrestrial network (NTN) capabilities associated with a user equipment (UE), wherein the set of NTN capabilities includes one or more of: a supported NTN band, NTN cell camped information, an NTN cell type, an NTN public land mobile network (PLMN), or a support for dual TN and NTN connectivity;
  - receive an indication of the UE being camped on an NTN cell based on at least one of: (1) when a radio resource connection (RRC) reconnection is established for the UE between a terrestrial network (TN) and an NTN during a positioning session, (2) when the UE has both TN connectivity and NTN connectivity during the positioning session, or (3) when the UE has at least one high priority task; and
  - transmit, for the UE in response to the indication, updated assistance data (AD) based on the set of NTN capabilities associated with the UE.

2. The apparatus of claim 1, wherein the at least one high priority task includes at least one of:
- an emergency call,
- an emergency short message service (SMS),
- a voice message, a data message, or an SMS message from a high priority user,
- wireless emergency alerts (WEA), or
- a lawful interception.

3. The apparatus of claim 1, wherein to receive the set of NTN capabilities, the at least one processor is configured to:
- receive, from an access and mobility management function (AMF), the set of NTN capabilities.

4. The apparatus of claim 3, wherein to receive, from the AMF, the set of NTN capabilities, the at least one processor is configured to:
- receive, from the AMF, the set of NTN capabilities based on a positioning protocol.

5. The apparatus of claim 1, wherein to receive the set of NTN capabilities, the at least one processor is configured to:
- receive, from the UE, the set of NTN capabilities.

6. The apparatus of claim 5, wherein to receive, from the UE, the set of NTN capabilities, the at least one processor is configured to:
- receive, from the UE, the set of NTN capabilities based on a positioning protocol.

7. The apparatus of claim 1, wherein to transmit the updated AD, the at least one processor is configured to:
- transmit the updated AD via the NTN.

8. The apparatus of claim 1, wherein the location server is a location management function (LMF).

9. A method of wireless communication at a location server, comprising:
- receiving a set of non-terrestrial network (NTN) capabilities associated with a user equipment (UE), wherein the set of NTN capabilities includes one or more of: a supported NTN band, NTN cell camped information, an NTN cell type, an NTN public land mobile network (PLMN), or a support for dual TN and NTN connectivity;
- receiving an indication of the UE being camped on an NTN cell based on at least one of: (1) when a radio resource connection (RRC) reconnection is established for the UE between a terrestrial network (TN) and an NTN during a positioning session, (2) when the UE has both TN connectivity and NTN connectivity during the positioning session, or (3) when the UE has at least one high priority task; and
- transmitting, for the UE in response to the indication, updated assistance data (AD) based on the set of NTN capabilities associated with the UE.

10. An apparatus for wireless communication at a user equipment (UE), comprising:
- at least one memory; and
- at least one processor coupled to the at least one memory, the at least one processor is configured to:
  - transmit a set of non-terrestrial network (NTN) capabilities associated with the UE, wherein the set of NTN capabilities includes one or more of: a supported NTN band, NTN cell camped information, an NTN cell type, an NTN public land mobile network (PLMN), or a support for dual TN and NTN connectivity;
  - camp on an NTN cell based on at least one of: (1) when a radio resource connection (RRC) reconnection is established for the UE between a terrestrial network (TN) and an NTN during a positioning session, (2) when the UE has both TN connectivity and NTN connectivity during the positioning session, or (3) when the UE has at least one high priority task; and receive, from a location server based on the UE being camped on the NTN cell, updated assistance data (AD) configured based on the set of NTN capabilities associated with the UE.

11. The apparatus of claim 10, wherein the at least one high priority task includes at least one of:

an emergency call, an emergency short message service (SMS), a voice message, a data message, or an SMS message from a high priority user, wireless emergency alerts (WEA), or a lawful interception.

12. The apparatus of claim 10, wherein to transmit the set of NTN capabilities, the at least one processor is configured to:

transmit, to an access and mobility management function (AMF), the set of NTN capabilities.

13. The apparatus of claim 12, wherein to transmit, to the AMF, the set of NTN capabilities, the at least one processor is configured to:

transmit, to the AMF, the set of NTN capabilities based on a positioning protocol or based on a radio resource control (RRC) mobility or an RRC re-establishment procedure.

14. The apparatus of claim 10, wherein to transmit the set of NTN capabilities, the at least one processor is configured to:

transmit, to the location server, the set of NTN capabilities.

15. The apparatus of claim 14, wherein to transmit, to the location server, the set of NTN capabilities, the at least one processor is configured to:

transmit, to the location server, the set of NTN capabilities based on a positioning protocol.

16. The apparatus of claim 10, wherein to receive the updated AD, the at least one processor is configured to:

receive the updated AD via the NTN.

17. The apparatus of claim 10, wherein the location server is a location management function (LMF).

18. The apparatus of claim 10, wherein the at least one processor is further configured to:

initiate or resume the positioning session based on the updated AD.

* * * * *